United States Patent
Lee et al.

(10) Patent No.: US 11,792,760 B2
(45) Date of Patent: *Oct. 17, 2023

(54) METHOD AND APPARATUS FOR PROVIDING LOCAL AREA DATA NETWORK SERVICE BASED ON NON-SUBSCRIPTION MODEL IN WIRELESS COMMUNICATION SYSTEM

(71) Applicant: Samsung Electronics Co., Ltd., Suwon-si (KR)

(72) Inventors: Jicheol Lee, Suwon-si (KR); Kisuk Kweon, Suwon-si (KR); Sangjun Moon, Suwon-si (KR); Jungshin Park, Suwon-si (KR); Beomsik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/706,480

(22) Filed: Mar. 28, 2022

(65) Prior Publication Data

US 2022/0225262 A1    Jul. 14, 2022

Related U.S. Application Data

(63) Continuation of application No. 16/983,616, filed on Aug. 3, 2020, now Pat. No. 11,310,758, which is a (Continued)

(30) Foreign Application Priority Data

Apr. 5, 2018    (KR) .................. 10-2018-0039822

(51) Int. Cl.
*H04W 60/00*    (2009.01)
*H04W 48/16*    (2009.01)
*H04W 4/70*    (2018.01)

(52) U.S. Cl.
CPC ............ *H04W 60/00* (2013.01); *H04W 4/70* (2018.02); *H04W 48/16* (2013.01)

(58) Field of Classification Search
CPC ....... H04W 60/00; H04W 4/70; H04W 48/16; H04W 4/02; H04W 48/18; H04W 60/04;
(Continued)

(56) References Cited

U.S. PATENT DOCUMENTS 9,398,398 B2    7/2016 Muhanna et al.
10,736,069 B2 *  8/2020 Lee .................. H04L 67/12
(Continued)

FOREIGN PATENT DOCUMENTS

CN        107743307 A     2/2018
KR    10-2018-0021636 A   3/2018
(Continued)

OTHER PUBLICATIONS

Huawei et al., "Discussion on aspects for LADN", SA WG2 Meeting #126, Feb. 26, 2018-Mar. 2, 2018, S2-182275, 4 pages.
(Continued)

*Primary Examiner* — Brandon J Miller

(57) ABSTRACT

The disclosure relates to a communication technique and system for converging a 5G communication system for supporting higher data rates beyond a 4G system with an IoT technology. The disclosure relates to a wireless communication system, and more particularly, to a method and an apparatus for providing a local area data network service based on a non-subscription model in a cellular wireless communication system (5G system).

20 Claims, 16 Drawing Sheets

Related U.S. Application Data continuation of application No. 16/375,715, filed on Apr. 4, 2019, now Pat. No. 10,736,069.

(58) Field of Classification Search
CPC ..... H04W 8/025; H04W 48/04; H04W 4/021; H04W 80/10; H04L 67/12; H04L 67/141; H04L 67/00

See application file for complete search history.

(56) References Cited

U.S. PATENT DOCUMENTS

| | | | |
|---|---|---|---|
| 2017/0155516 | A1 | 6/2017 | Bergius et al. |
| 2018/0041856 | A1 | 2/2018 | Lou et al. |
| 2018/0279214 | A1 | 9/2018 | Chandramouli et al. |
| 2018/0279397 | A1* | 9/2018 | Faccin .................. H04W 76/15 |
| 2019/0174449 | A1* | 6/2019 | Shan .................... H04W 60/00 |
| 2019/0200264 | A1 | 6/2019 | Kim et al. |
| 2019/0254118 | A1 | 8/2019 | Dao et al. |
| 2019/0261260 | A1 | 8/2019 | Dao et al. |
| 2020/0337093 | A1 | 10/2020 | Kim et al. |
| 2021/0076250 | A1 | 3/2021 | Wang et al. |

FOREIGN PATENT DOCUMENTS

| | | |
|---|---|---|
| KR | 10-2018-0108044 A | 10/2018 |
| RU | 2611976 C2 | 3/2017 |
| WO | 2018038490 A1 | 3/2018 |
| WO | 2018050007 A1 | 3/2018 |

OTHER PUBLICATIONS

Office Action dated Oct. 18, 2022 in connection with Chinese Patent Application No. 201980022729.X, 19 pages.
Huawei et al., "Discussion on aspects for LADN," SA WG2 Meeting #126, Feb. 26, 2018-Mar. 2, 2018, 4 pages, S2-182275.
"3rd Generation Partnership Project; Technical Specification Group Services and System Aspects; System Architecture for the 5G System; Stage 2 (Release 15)," 3GPP TS 23.501 V15.1.0 (Mar. 2018), 201 pages.
"3rd Generation Partnership Project; Technical Specification Group Services and System Aspects; Policy and Charging Control Framework for the 5G System; Stage 2 (Release 15)," 3GPP TS 23.503 V15.1.0 (Mar. 2018), 65 pages.
"3rd Generation Partnership Project; Technical Specification Group Core Network and Terminals; Non-Access-Stratum (NAS) protocol for 5G System (5GS); Stage 3 (Release 15)," 3GPP TS 24.501 V1.0.0 (Mar. 2018), 253 pages.
International Search Report dated Jul. 9, 2019 in connection with International Patent Application No. PCT/KR2019/003872, 3 pages.
Written Opinion of the International Searching Authority dated Jul. 9, 2019 in connection with International Patent Application No. PCT/KR2019/003872, 4 pages.
Samsung R D Institute UK et al., "New AT Command to request and receive LADN information from the network +CLADN," 3GPP TSG-CT WG1 Meeting #113, C1-188837, Nov. 2018, 6 pages.
Official Action and Search Report dated Jan. 24, 2022, in connection with Russian Application No. 2020132313/07 (058816), 18 page.
European Patent Office, "Communication pursuant to Article 94(3) EPC," dated Apr. 20, 2023, in connection with European Patent Application No. 19781894.1, 6 pages.

* cited by examiner

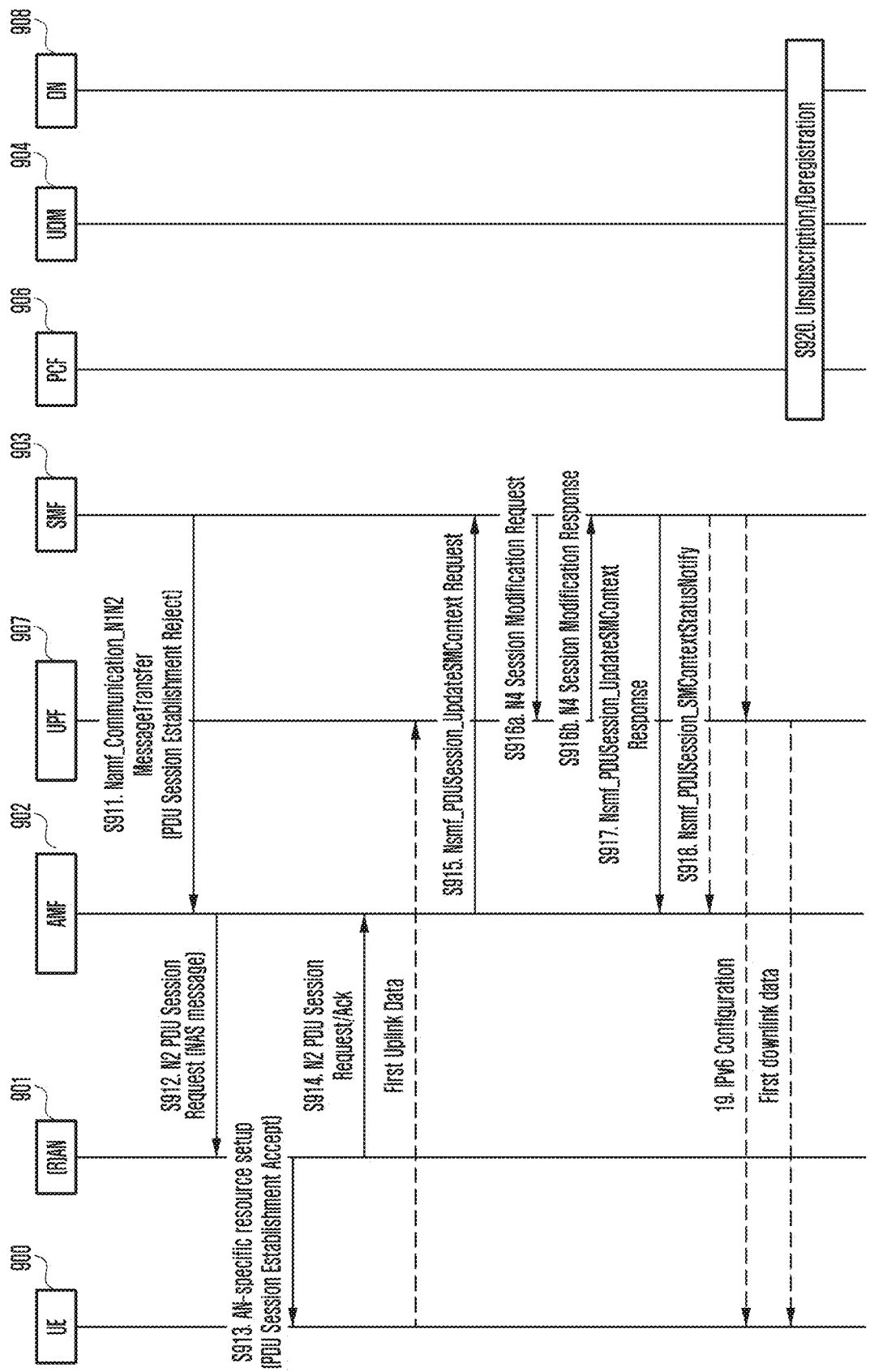

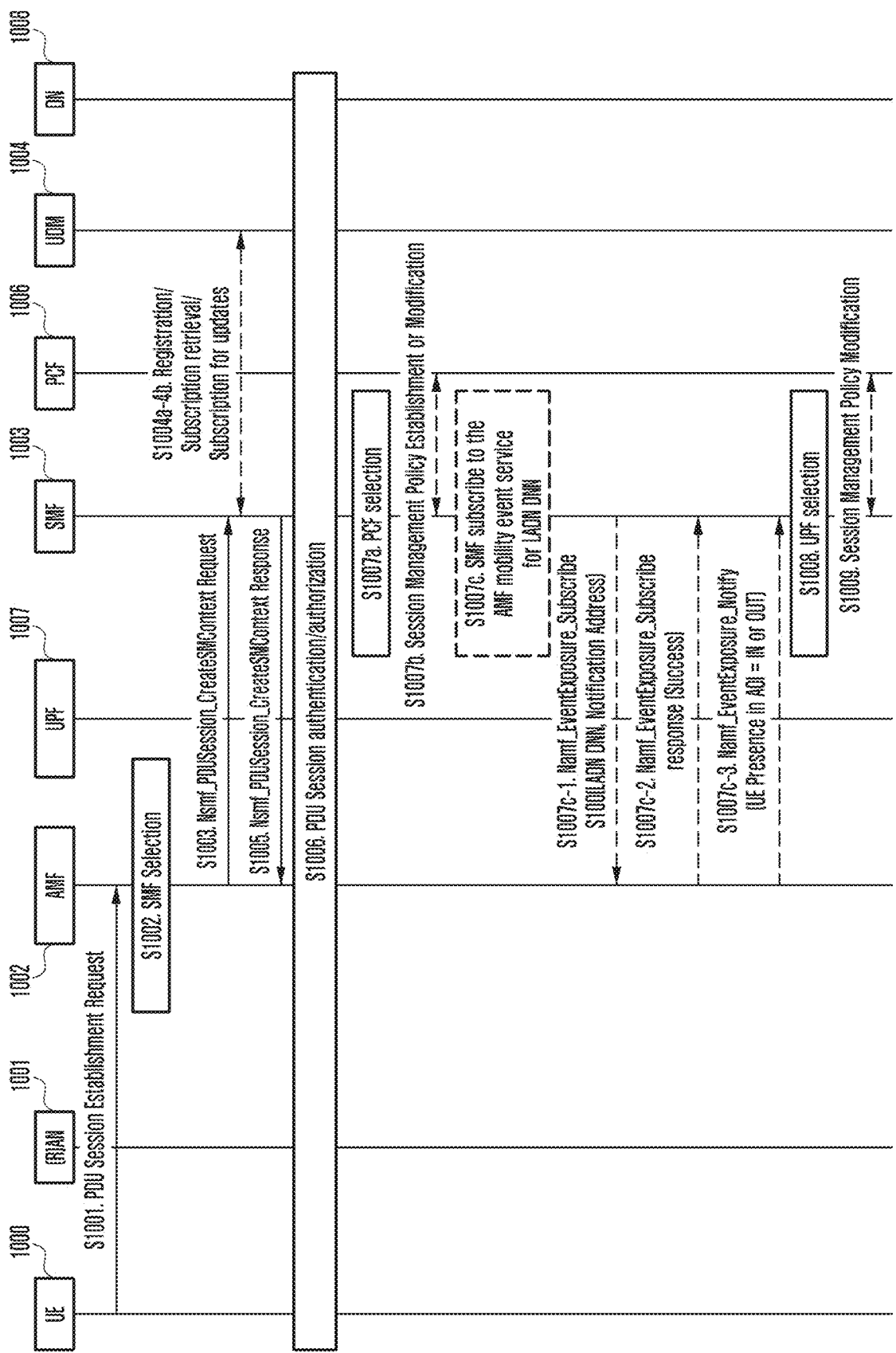

METHOD AND APPARATUS FOR PROVIDING LOCAL AREA DATA NETWORK SERVICE BASED ON NON-SUBSCRIPTION MODEL IN WIRELESS COMMUNICATION SYSTEM

CROSS-REFERENCE TO RELATED APPLICATIONS

This application is a continuation of application Ser. No. 16/983,616, filed Aug. 3, 2020, which is a continuation of application Ser. No. 16/375,715, filed on Apr. 4, 2019, now U.S. Pat. No. 10,736,069, which claims priority under 35 U.S.C. § 119 to Korean Patent Application No. 10-2018-0039822, filed on Apr. 5, 2018, in the Korean Intellectual Property Office, the disclosures of which are incorporated by reference herein in their entirety.

BACKGROUND

1. Field of the Invention

The disclosure relates to a wireless communication system, and more particularly, to a method and an apparatus for providing a local area data network service based on a non-subscription model in a cellular wireless communication system (5G system).

2. Description of the Related Art

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE System."

Implementation of the 5G communication system in ultra-high frequency (mmWave) bands, e.g., 60 GHz bands, is being considered in order to accomplish higher data rates. To mitigate a path loss of the radio waves and increase the transmission distance on the radio waves in the ultrahigh frequency, beamforming, massive multiple-input multiple-output (massive MIMO), full dimensional MIMO (FD-MIMO), array antenna, analog beamforming, and large scale antenna techniques are being discussed for 5G communication systems.

In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

Meanwhile, the Internet, which is a human centered connectivity network where humans generate and consume information, is now evolving to the Internet of things (IoT) where distributed entities, such as things, exchange and process information without human intervention. The Internet of everything (IoE), which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, recently there has been research on technologies, such as a sensor network for connection between machines, machine-to-machine (M2M) communication, and machine type communication (MTC).

Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by beamforming, MIMO, and array antennas, which correspond to 5G communication technology. Application of a cloud radio access network (cloud RAN) as the above-described big data processing technology may also be considered to be an example of convergence between the 5G technology and the IoT technology.

Meanwhile, in order to achieve evolution from the existing 4G LTE system into the 5G system, 3GPP that takes charge of the cellular mobile communication standard has named a new core network structure a 5G core (5GC) and has proceeded with the standardization thereof.

As compared with an evolved packet core (EPC) that is an existing 4G network core, the 5GC supports the following discriminated functions.

First, in the 5GC, a network slice function is introduced. As the 5G requirements, the 5GC should support various types of terminals and services: e.g., enhanced mobile broadband (EMBB), ultra-reliable low latency communications (URLLC), and massive machine type communications (mMTC).

Such terminals/services have different requirements in respective core networks. For example, in case of an eMBB service, high data rate may be required, whereas in case of a URLLC service, high stability and low latency may be required. A technology proposed to satisfy such various service requirements is a network slice scheme.

Network slice is a method for virtualizing one physical network to make several logic networks, and respective network slice instances (NSIs) may have different characteristics. Accordingly, the respective NSIs have network functions (NF) that suit the characteristics thereof, and thus they can satisfy various service requirements. Several 5G services can be efficiently supported by allocating, to respective terminals, the NSIs that suit the characteristics of services required for the respective terminals.

Second, the 5GC can easily support network virtualization paradigms through separation between a mobility management function and a session management function. In the existing 4G LTE, all terminals can be provided with services in a network through signaling exchange with single-core equipment that is called a mobility management entity (MME) taking charge of registration, authentication, mobility management, and session management functions.

However, in the 5G, since the number of terminals is explosively increased, and mobility and traffic/session characteristics to be supported are subdivided in accordance with terminal types, scalability to add entities for necessary functions is lowered in case where all functions are supported by the single equipment such as the MME. Accordingly, in order to improve the scalability in function/implementation complexity of the core equipment taking charge of control plane and signaling load, various functions have been developed based on a structure for separating the mobility management function and the session management function from each other.

SUMMARY

The disclosure enables a local area data network (LADN) service provided by an enterprise to be provided to a terminal that has not subscribed to the LADN service of the enterprise. As described above, in order to provide the LADN of the enterprise to a user who has not subscribed to the LADN, there is a need for a method capable of transferring LADN information to the user regardless of whether the enterprise has subscribed to a specific LADN data network name (DNN) of the user.

In a subscription model, the enterprise determines whether the terminal has subscribed to the LADN, for example, an access and mobility management function (AMF) determines whether the user has subscribed to the LADN DNN through user data management (UDM), and the enterprise transfers the LADN information to the terminal in the case where the user registers for the AMF providing the LADN. In the registration process, the terminal having received the LADN information determines an LADN service available area based on LADN service area information included in the LADN information, and if necessary, the terminal can receive an LADN service by generating a protocol data unit (PDU) session for the LADN DNN.

A method for transferring the LADN information to the terminal is performed in a state where user's intention to use the LADN service is not known. In the subscription model, because the LADN information is transferred to the subscribed terminal only even though the user's intention to use the LADN service is not known, a method is provided, in which the subscribed terminal can use the LADN service at any time.

However, in a non-subscription model, transfer of the LADN information in a situation where the enterprise does not know the terminal's intention to use the LADN service causes heavy traffic to occur due to a lot of registration accept messages. For example, even if it is intended for 100 terminals to use the LADN service in an actual LADN service in a state where 10 LADN areas exist in one registration area, and 1000 terminals are registered, the AMF should transfer 10 pieces of LADN information to 1000 terminals. However, in this case, because 900 terminals do not have intentions to use the LADN service, providing of the SADN information to 900 terminals causes waste of radio resources.

To solve this problem, the disclosure proposes a method for transferring LADN information to a terminal only in the case where a user intends to use an LADN service in order to support a non-subscription model.

In the disclosure, it is necessary for a terminal that has not subscribed to an LADN service to receive transferred LADN information (LADN DNN and LADN service area), as needed, in accordance with a scenario in which an application program uses a network. Further, a method is proposed, in which a terminal requests creation of a PDU session corresponding to an LADN without determining whether or not the terminal is located in an LADN service area in the case where the terminal requests session creation for a designated DNN, and if the terminal is not located in the LADN service area and thus the session creation for the LADN has failed, the terminal can acquire LADN service area information.

The disclosure proposes a method for rejecting session creation if a terminal requests the session creation outside an LADN service area in accord with the original purpose of the LADN service.

Further, the disclosure proposes a method, in which a packet is not transferred to a terminal when the terminal moves out of an LADN service area, whereas the packet is transferred again to the terminal when the terminal re-enters into the LADN service area, in accord with the original purpose of the LADN service.

In an embodiment of the disclosure, a terminal can transmit or receive a packet only in a specific area designated by an enterprise. Through the disclosure, the enterprise provides a service for making a user receive a high-speed service only in the corresponding specific area in a manner that the enterprise provides the high-speed service, for example, only in a large stadium if it is required to support the high-speed service only in the specific area, whereas the enterprise can stop the service provided to the user if the user secedes from the area.

Similarly, the LADN service is applied to an enterprise service for employee's business, and makes it possible to configure a network that guarantees security and is usable only in a business place in a manner that the LADN service allows an access to a network that is accessible in the business place only in the case of a location in the business place, whereas the LADN service stops the network access in the case where a user secedes from the business place.

Further, a network is configured, to which an access is allowed only in a specific area, such as a shopping mall, and an enterprise can provide a network service in the specific area as a service having a different charging system (e.g., free billing) from a $3^{rd}$ party.

According to an embodiment of the disclosure to solve the above-described problems, a terminal requests transfer of LADN information including an LADN service area and LADN DNN information from an AMF, and the AMF transfers the LADN information to the terminal, transfers the LADN information to the terminal in response to a terminal's request for PDU session creation for the LADN, or transfers the LADN information to the terminal in the case of rejecting the PDU session creation.

If the terminal according to an embodiment of the disclosure is not located in an LADN service area, in order to reject the PDU session creation requested by the terminal, a method is provided, in which a network (session management function (SMF)) identifies whether the terminal exists in the LADN service area, which is notified by an AMF, and the network determines whether to create the PDU session.

If the terminal according to an embodiment of the disclosure moves out of the LADN service area after creating an LADN session, in order to prevent a packet from being transferred to the terminal, a method is provided, in which an SMF identifies a notification notifying whether the terminal exists in the LADN service area from the AMF, and commands a user plane function (UPF) to perform a drop so that a downlink packet is not transferred to the terminal.

If the terminal according to an embodiment of the disclosure re-enters from an outside into the LADN service area after creating the LADN session, in order to retransfer the downlink packet to the terminal, a method is used, in which the SMF indicates buffering to the UPF or indicates packet forwarding to the SMF to transfer the downlink packet to the terminal.

According to an embodiment of the disclosure, a method by an access and mobility management function (AMF) in a wireless communication system comprises receiving, from a terminal, a registration request message including information for requesting a list of local area data network (LADN), identifying a subscribed LADN data network name (DNN) of the terminal, based on the registration request message, determining LADN information to be provided to the terminal, based on the subscribed DNN of the terminal, and transmitting, to the terminal, a registration accept message including the determined LADN information, wherein the determined LADN information includes the list of LADN available to the terminal, and wherein the list of LADN available to the terminal is determined based on the information for requesting the list of LADN.

In an embodiment of the disclosure, a method by a terminal in a wireless communication system comprises transmitting, to an access and mobility management function (AMF), a registration request message including information for requesting a list of local area data network (LADN), and receiving, from the AMF, a registration accept message including LADN information for the list of LADN available to the terminal, wherein the LADN information is determined by the AMF based on a subscribed LADN data network name (DNN) of the terminal, and wherein the list of LADN available to the terminal is determined by the AMF based on the information for requesting the list of LADN.

In an embodiment of the disclosure, an access and mobility management function (AMF) in a wireless communication system comprises a transceiver, and a controller configured to control the transceiver to receive, from a terminal, a registration request message including information for requesting a list of local area data network (LADN), identify a subscribed LADN data network name (DNN) of the terminal, based on the registration request message, determine LADN information to be provided to the terminal, based on the subscribed DNN of the terminal, and control the transceiver to transmit, to the terminal, a registration accept message including the determined LADN information, wherein the determined LADN information includes the list of LADN available to the terminal, and wherein the list of LADN available to the terminal is determined based on the information for requesting the list of LADN.

In an embodiment of the disclosure, a terminal in a wireless communication system comprises a transceiver, and a controller configured to control the transceiver to transmit, to an access and mobility management function (AMF), a registration request message including information for requesting a list of local area data network (LADN), and control the transceiver to receive, from the AMF, a registration accept message including LADN information for the list of LADN available to the terminal, wherein the LADN information is determined by the AMF based on a subscribed LADN data network name (DNN) of the terminal, and wherein the list of LADN available to the terminal is determined by the AMF based on the information for requesting the list of LADN.

According to the disclosure, a method is proposed, in which a local enterprise or a visited-network enterprise can transfer LADN information to a non-subscribed terminal so as to provide an LADN service to the terminal. If a large number of terminals exist in a specific area, the LADN information is transferred only to terminals that intend to use the LADN service, and thus unnecessary signaling traffic does not occur.

According to the disclosure, if the terminal that is out of the LADN area requests session creation, the enterprise may reject the session creation request.

According to the disclosure, if the terminal moves out of the LADN service area after the LADN session creation, a downlink packet can be prevented from being transferred to the terminal, whereas if the terminal re-enters into the LADN service area, the downlink packet can be transferred to the terminal to achieve the original purpose of the LADN service.

In the disclosure, both the method for allowing or rejecting the LADN session creation through the information on whether the terminal exists in the LADN service area and the method for preventing packet reception when the terminal moves out of the LADN service area are technologies capable of providing, for example, a high-speed service in a stadium, a security service in an enterprise network, or a free-billing network service at a shopping mall as described above.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9B illustrates a diagram of a method for determining whether to allow an LADN session by determining success/failure of a terminal mobility that an SMF reports to an AMF through an LADN DNN;

FIG. 10A illustrates a diagram of a procedure in which an SMF determines whether to allow LADN session creation after reception of LADN related location information from an AMF after the SMF has successfully subscribed to a terminal mobility report service provided by the AMF as an LADN DNN;

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings. In describing the disclosure, a detailed description of related known functions or configurations will be omitted if it is determined that it obscures the disclosure in unnecessary detail. Further, all terms used in the description are general terms that are widely used in consideration of their functions in the disclosure, but may differ depending on intentions of a person skilled in the art to which the disclosure belongs, customs, or appearance of new technology. Accordingly, they should be defined based on the contents of the whole description of the disclosure.

Hereinafter, a base station is a subject that performs resource allocation to a terminal, and may be at least one of an eNode B, Node B, base station (BS), radio access network (RAN), access network (AN), RAN node, radio connection unit, base station controller, and node on a network. A terminal may include user equipment (UE), mobile station (MS), cellular phone, smart phone, computer, or multimedia system capable of performing a communication function. In the disclosure, a downlink (DL) is a radio transmission path of a signal that is transmitted from the base station to the terminal, and an uplink (UL) means a radio transmission path of a signal that is transmitted from the terminal to the base station.

Although embodiments of the disclosure will be described hereinafter as being exemplified through an LTE or LTE-A system, they can also be applied to other communication systems having similar technical backgrounds or channel types. Further, the embodiments of the disclosure may also be applied to other communication systems through partial modifications thereof in a range that does not greatly deviate from the scope of the disclosure by the judgment of those skilled in the art.

Figure 1:
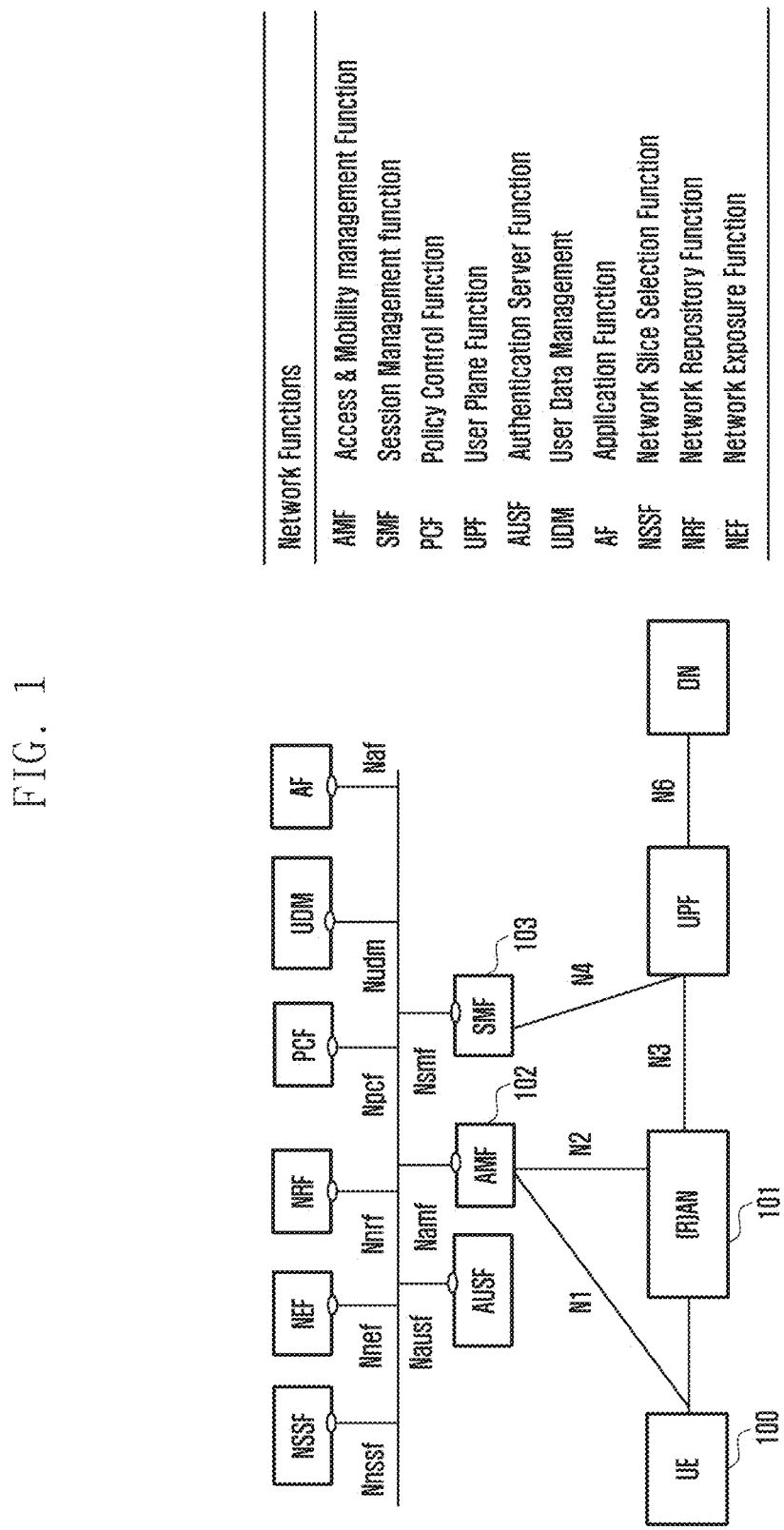
FIG. 1 illustrates a diagram of a network structure of a 5G system and an interface.

FIG. 1 illustrates a diagram of a network architecture for a 5G system.

According to an LADN service, an enterprise constructs a geographical area with a base station, and it provides a data network connection service to a terminal (UE) only within a specific area. In the case of a non-subscription model being described in the disclosure, the enterprise provides the LADN service to a non-subscribed terminal. The enterprise constructs an LADN service area in the form of a cell list or a tracking area list, and it configures the LADN service area in an AMF 102. In the subscription model based LADN service, the AMF 102 transfers the non-subscription LADN information to the terminal when the terminal 100 performs a registration procedure.

The terminal 100 receives LADN information, identifies whether a network (camping network) 101 to which the terminal is currently connected is within an LADN service area, and requests creation of a PDU session if the terminal 100 is located in the LADN service area. If the terminal 100 requests the creation of the PDU session from an LADN DNN, an SMF 103 identifies whether a DNN requested by the terminal 100 is the LADN DNN using predetermined information, and it determines whether to create the PDU session. The SMF 103 accepts the PDU session creation request, and after a successful PDU session is created, the terminal 100 transmits and receives a packet using the PDU session.

The terminal 100 determines whether packet transmission/reception is allowed in the area based on received LADN service area information and network information that the terminal 100 is currently camping, and it transmits and receives the packet only in the allowed area. Otherwise, the terminal 100 does not transmit the packet, and it does not send a service request in a CM-IDLE state.

If the terminal 100 moves from the LADN service area to another area except the LADN service area, the network detects the movement of the terminal 100, and it blocks the packet destination. If the terminal 100 re-enters from the area except the LADN service area to the LADN service area, the network detects the movement of the terminal 100, and it allows the packet destination.

The (1-1)-th Embodiment

In the (1-1)-th embodiment, a terminal-requested LADN information transfer procedure using a terminal (UE) configuration update request message will be described with reference to FIG. 2.

At operation S200b of FIG. 2, a terminal 200 determines a UE configuration update request in order to receive LADN information (as another example, in the same manner as operation S200a of FIG. 2, even though an AMF may determine the necessity of the UE configuration update or reregistration, a case of operation S200b of FIG. 2 will be described with reference to the corresponding drawing).

The terminal 200 may transfer the LADN information to a communication processor (CP) (which corresponds to a modem of the terminal, and if the terminal is separated into a mobile terminal and terminal equipment as in TS27.007, the CP corresponds to an MT) of the terminal 200 implementing 5GC non-access stratum (NAS) by means of a mobile operating system or newly installed app request, user input in the installed app or app program logic, and it may make the CP of the terminal 200 determine the UE configuration update request. Further, if it is necessary to receive the LADN information for a specific LADN DNN through the app request or user request, the terminal 200 to which the LADN DNN is configured may request the reception of the LADN information.

Figure 2:
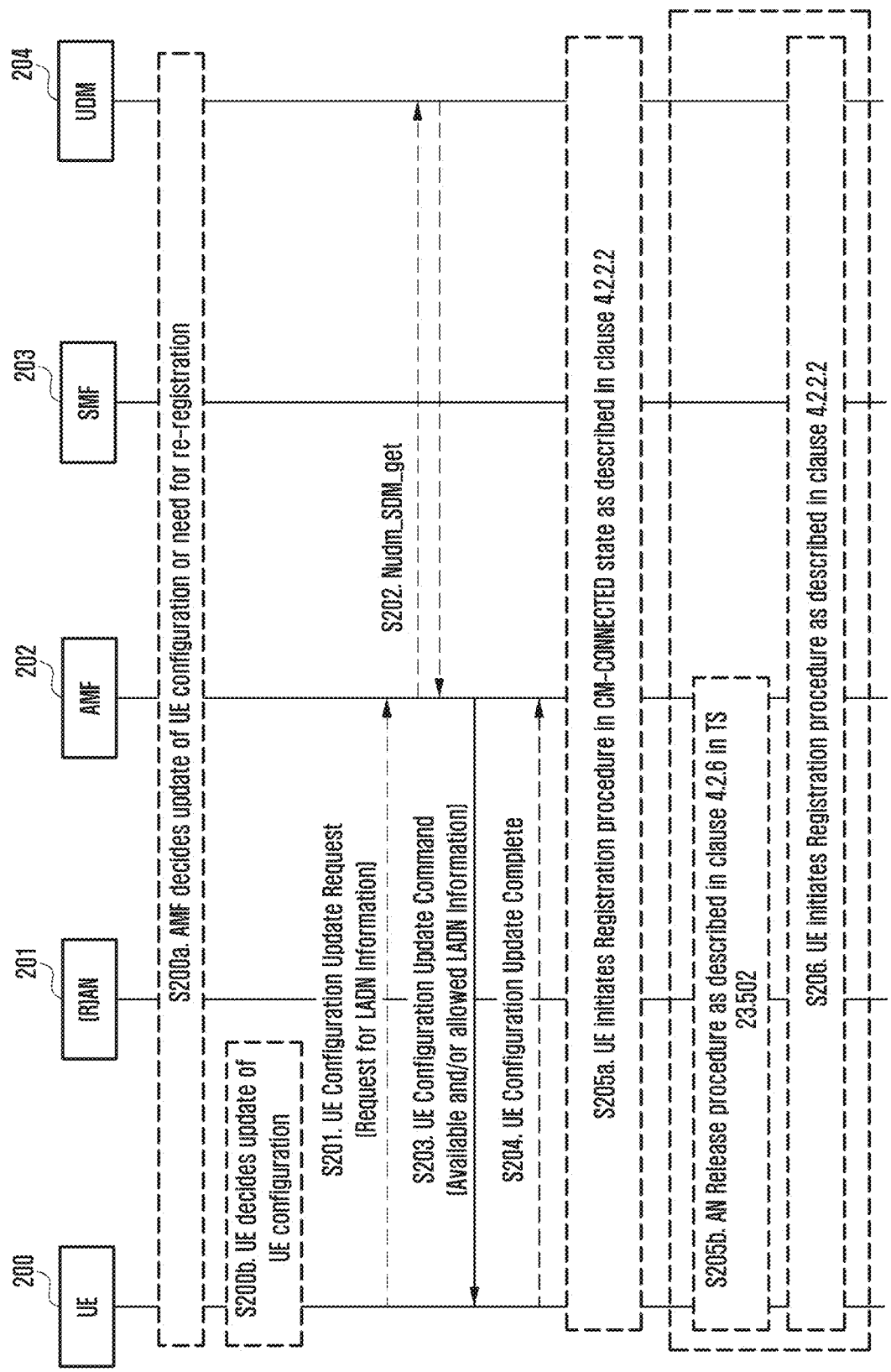
FIG. 2 illustrates a diagram of a terminal-requested LADN information transfer procedure using a terminal (UE) configuration update procedure.

At operation S201 of FIG. 2, the terminal 200 sends the UE configuration update request to the AMF 202 in order to receive the LADN information. Through the UE configuration update request, the terminal 200 may request the LADN information available in the current registration area. Further, the terminal 200 may also request the LADN information for a specific LADN DNN.

If the terminal 200 requests the LADN information available in the current registration area, the terminal 200 includes an LADN information request indication available in the registration area in a UE configuration update message to be transferred. Further, if the terminal 200 requests whether the specific LADN DNN is available, or if the terminal requests the LADN information that is available, the terminal 200 may transfer a list of DNN for identification to the AMF 202.

The AMF 202 requests subscriber information from a UDM 204 in order to determine whether it is possible to use the LADN. That is, as at operation S202 of FIG. 2, the AMF 202 requests the subscriber information from the UDM 204 in order to determine whether it is possible to use the LADN for the terminal that has transmitted the request.

Further, the AMF 202 determines whether to allow the terminal 200 to use the LADN service, and transfers, to the allowed terminal, a list of LADN information available in the current registration area of the terminal 200 in accordance with operation S203 of FIG. 2.

If the terminal 200 requests the LADN information available in the registration area, the AMF 202 transfers, to the terminal 200, the LADN information on the LADNs (i.e., LADN DNN and LADN service area information) for which the whole or a part of the LADN service area is included in the registration area allocated to the terminal 200 with respect to the LADN(s) configured in the AMF 202. If the available LADN does not exist in the registration area of the terminal 200, the AMF 202 notifies the terminal 200 of such nonexistence through transfer of a message including an indication indicating the nonexistence to the terminal 200.

If the terminal 200 requests the LADN information on specific LADN DNN(s), the AMF 202 identifies whether the requested LADN DNN is the LADN DNN configured in the AMF 202, identifies whether the whole or a part of the corresponding LADN service area is included in the registration area allocated to the terminal 200, and then transfers the list of the LADN information for the requested LADN list to the terminal 200.

If the AMF 202 determines that the LADN available in the registration area of the terminal does not exist with respect to the LADN DNN list requested by the terminal, the AMF 202 notifies the terminal 202 of such nonexistence through transfer of a message including an indication indicating that the information on the LADN DNN requested from the AMF 202 does not exist to the terminal 200.

Meanwhile, if the UE configuration update procedure is completed, the terminal 200 may transmit a UE configuration update complete to the AMF 202 to notify of this at operation S204. After the completion of the UE configuration update (S204), the registration procedure started by the terminal 200 may be performed (S205a). After the completion of the UE configuration update (S204), the base station 201 may release all resources for the terminal 200 through performing of an AN release procedure, and it may start the registration procedure in a CM-IDLE state (S206).

The (1-2)-th Embodiment

In the (1-2)-th embodiment, a terminal-requested LADN information transfer procedure using a terminal (UE) registration procedure will be described with reference to FIG. 3.

Figure 3:
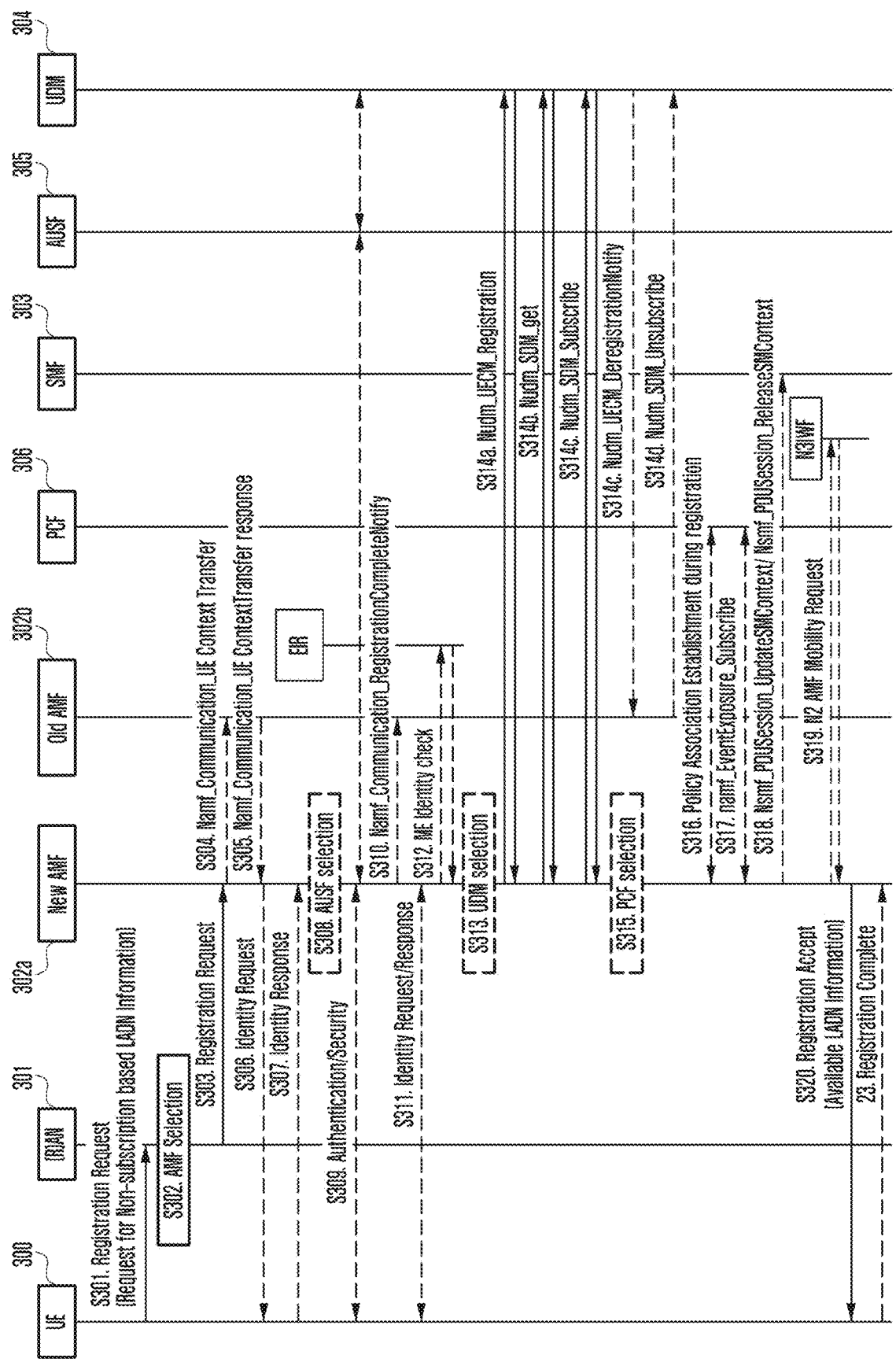
FIG. 3 illustrates a diagram of a terminal-requested LADN information transfer procedure using a registration procedure.

With reference to FIG. 3, in order to receive LADN information, a terminal 300 includes an LADN information request indication for requesting whether available LADN information exists in a registration area (RA) in a registration request message, and it sends the registration request message to an AMF 302 (S301). For example, the registration request message at operation S301 may be a request for non-subscription based on the LADN information. A base station 301 having received this may select the AMF (S302), and it may transmit the registration request to the selected AMF 302a (S303). Meanwhile, if the selected AMF 302a is a new AMF, the selected AMF 302a may request UE context transfer from the existing AMF 302b, and it may receive a response to the request (S304 and S305).

Meanwhile, in order identify whether the registration request of the terminal is allowed, the AMF 302a may request an ID from the terminal, and it may receive a response to the request (S306 and S307). Further, the AMF 302a may select an authentication server function (AUSF) 305 for performing an authentication and complement procedure (S308), and then it may perform the authentication and complement procedure with the corresponding AUSF 305 and the terminal 300 (S309).

If the registration of the terminal 300 has succeeded after completion of the authentication and complement procedure, the AMF 302a may transmit a RegistrationCompleteNotify for notifying of such success to the existing AMF 302b (S310), and it may perform an ID request and response process for equipment registration of the terminal 300 (S311). As described above, through the received ID, an ME identity check operation may be performed between the AMF 302a and an equipment identity register (EIR) (S312).

Thereafter, the AMF 302a may select a user data management (UDM) 304 for identifying subscriber information of the terminal (S313). Further, the AMF 302a may transmit, to the UDM 304, a message for registering a serving network function (NF) of the terminal 300 or a serving NF of the session in the UDM 304 (S314a). Accordingly, the AMF 302a receives subscriber information of the terminal 300 from the UDM 304 (S314b), and it determines whether the requested terminal is allowed to use a non-subscription LADN service from the received information. After completion of a Nudm_UECM_registration procedure (S314a) with respect to the new AMF 302a, the UDM 304 performs Nudm_UECM_DeregistrationNotify procedures 314c and 314d with respect to the old AMF 302b.

Further, the AMF 302a may select a policy control function (PCF) 306 (S315), transmit, to the PCF 306, a policy association establishment message for policy related configuration during the registration (S316), and it may transmit/receive a message for event reception (namf_EventExposure_Subscribe) with the PCF 306 (S317).

Thereafter, the AMF 302a may transmit, to the SMF 303, signaling for association related to the PDU session (Nsmf_PDUSession_UpdateSMContext/Nsmf_PDUSession_ReleaseSMContext) (S318). Further, the AMF 302a may transmit/receive signaling for N3/WF and AMF mobility request (S319), determine whether the terminal 300 is allowed to use the non-subscription LADN service, and then transmit, to the terminal 300, the LADN information list that the terminal 300 can use in the registration area if the corresponding terminal 300 is a terminal that is allowed to use the non-subscription LADN service (S320).

The contents in which the terminal determines to send a registration request message for reception of the LADN information before performing the procedure according to the (1-2)-th embodiment may be applied in the same manner as the contents described in the procedure (S200b) according to the (1-1)-th embodiment.

The condition on which operations S301, S314b, and S320 in the (1-2)-th embodiment are performed may correspond to the condition on which operations S201, S202, and S203 in the (1-1)-th embodiment are performed, and the corresponding indication may be transferred, or the same process may be performed.

The (1-3)-th Embodiment

In the (1-3)-th embodiment, with reference to FIG. 4, a procedure will be described, in which whether LADN information is available is transferred to a terminal using a terminal registration procedure, and after the registration procedure, the terminal requests a terminal (UE) configuration information change (UE configuration update) and it receives the LADN information. Hereinafter, explanation of the contents duplicate to those in the above-described embodiments will be simplified or omitted.

Figure 4:
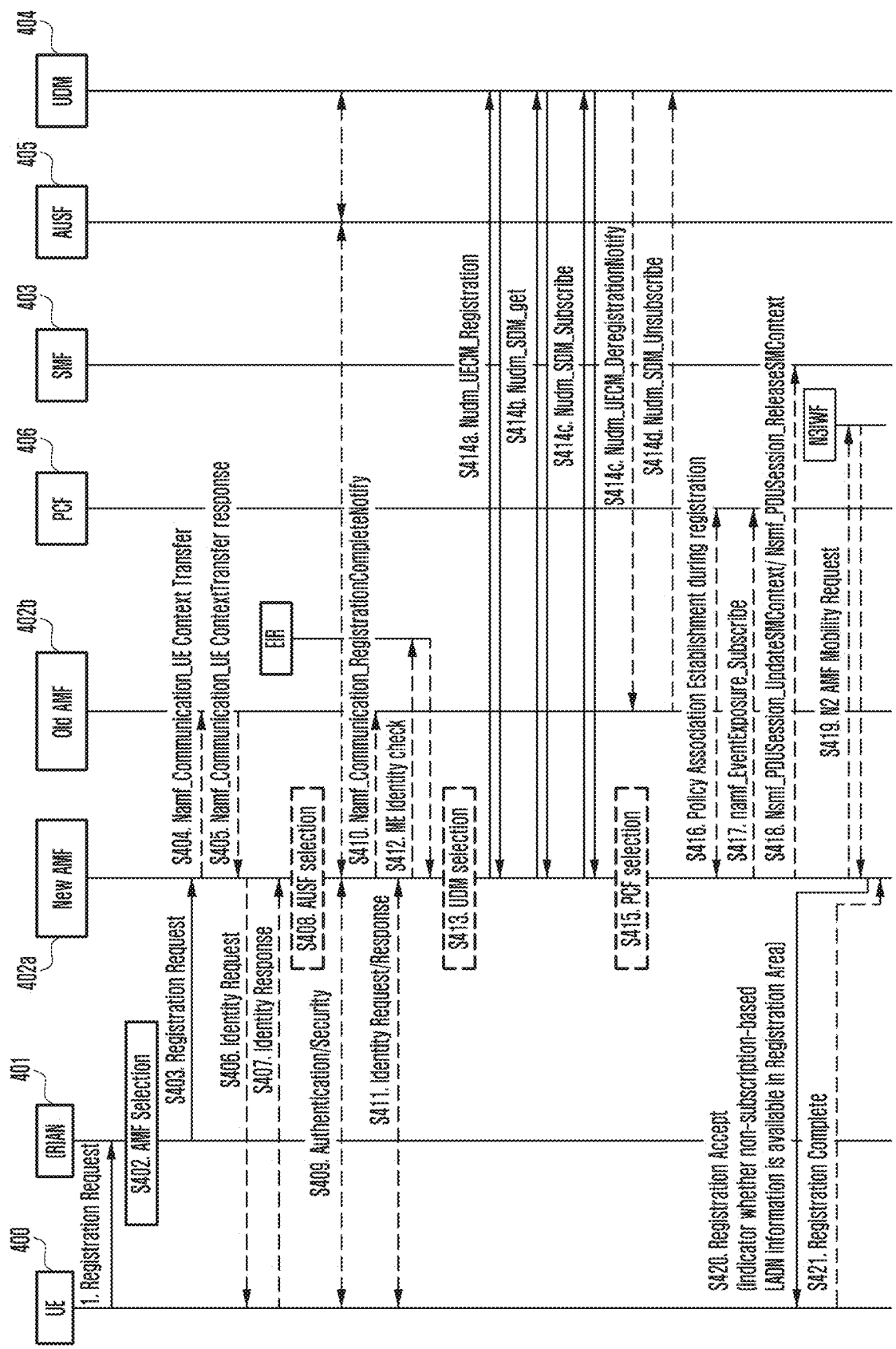
FIG. 4 illustrates a diagram of a procedure of transferring whether to provide LADN information in a registration procedure.

First, with reference to FIG. 4, in order to receive LADN information, a terminal 400 may transmit a registration request message to a base station 401 (S401). The base station 401 having received this may select an AMF (S402), and it may transmit the registration request to the selected AMF 402a (S403). Meanwhile, if the selected AMF 402a is a new AMF, the selected AMF 402a may request UE context transfer from the existing AMF 402b, and it may receive a response to the request (S404 and S405).

Meanwhile, in order identify whether the registration request of the terminal is allowed, the AMF 402a may request an ID from the terminal, and it may receive a response to the request (S406 and S407). Further, the AMF 402a may select an authentication server function (AUSF) 405 for performing an authentication and complement procedure (S408), and then it may perform the authentication and complement procedure with the corresponding AUSF 405 and the terminal 400 (S409).

If the registration of the terminal 400 has succeeded after completion of the authentication and complement procedure, the AMF 402a may transmit a RegistrationCompleteNotify for notifying of such success to the existing AMF 402b (S410), and it may perform an ID request and response process for equipment registration of the terminal 400 (S411). As described above, through the received ID, an ME identity check operation may be performed between the AMF 402a and an equipment identity register (EIR) (S412).

Thereafter, the AMF 402a may select a user data management (UDM) 404 for identifying subscriber information of the terminal (S413). Further, the AMF 402a may transmit, to the UDM 404, a message for registering a serving network function (NF) of the terminal 400 or a serving NF of the session in the UDM 404 (S414a). Accordingly, the AMF 402a receives subscriber information of the terminal 400 from the UDM 404 (S414b), and it determines whether the requested terminal is allowed to use a non-subscription LADN service from the received information. After completion of a Nudm_UECM_registration procedure (S414a) with respect to the new AMF 402a, the UDM 404 performs Nudm_UECM_DeregistrationNotify procedures 414c and 414d with respect to the old AMF 402b.

Further, the AMF 402a may select a policy control function (PCF) 406 (S415), transmit, to the PCF 406, a policy association establishment message for policy related configuration during the registration (S416), and transmit/receive a message for event reception (namf_EventExposure_Subscribe) with the PCF 406 (S417).

Thereafter, the AMF 402a may transmit, to the SMF 403, signaling for association related to the PDU session (Nsmf_PDUSession_UpdateSMContext/Nsmf_PDUSession_ReleaseSMContext) (S418). Further, the AMF 402a may transmit/receive signaling for N3/WF and AMF mobility request (S419).

Further, the AMF 402a determines whether the terminal 400 can receive the non-subscription LADN information through UDM information. If it is determined that the terminal 400 can receive the non-subscription LADN information and available LADN information exists in the registration area, the AMF 402a includes an indication indicating whether the available LADN information exists in a registration accept message, and it transfers the message to the terminal 400 (S420).

Accordingly, the terminal 400 having performed the successful registration procedure may determine that the LADN information is necessary through inclusion of an application program request, and it may request the LADN information from the AMF 402a through the procedure described in the (1-1)-th embodiment or the (1-2)-th embodiment (S421).

The (1-4)-th Embodiment

In the (1-4)-th embodiment, a condition on which a terminal triggers an LADN information request will be described.

In the terminal, a mobile operating system for operating a plurality of apps exists. Such apps may be downloaded from outside, such as a store or portal selling the apps, and they may be installed on the terminal operating system. In a series of processes to install the apps in the terminal, the app or mobile operating system may request information on whether the terminal can be provided with an LADN service in the current area for the LADN DNN from a terminal policy, user preference configuration, configuration for each app, or terminal policy including a terminal (UE) route selection policy received from an enterprise.

Such a request for information may be transferred from an application processor (hereinafter, AP) (corresponding to TE in the case where TE and MT are separated from each other as in 3GPP Technical Specification (TS) 27.007) to a communication processor (hereinafter, CP) (corresponding to MT in the case where TE and MT are separated from each other as in 3GPP TS 27.007) implementing a 5GC NAS function.

Such a request for information may be made when an app installed in the AP is initially operated, when the app calls a specific application programming interface (API) improved by the mobile operating system, or by a method determined by the mobile operating system.

If such information is requested, the AP of the terminal requests LADN service availability information from the CP of the terminal. The CP having received the request for the LADN service availability information from the AP of the terminal receives the LADN information from a network using the procedures described in the (1-1)-th, (1-2)-th, and (1-3)-th embodiments of the disclosure. The CP of the terminal having received the LADN information determines whether the LADN information is available in the current location of the terminal, and it transfers, to the AP, the received LADN DNN information and the information indicating the usability in the current location.

The (2-1)-th Embodiment

The (2-1)-th embodiment is related to a method for transferring LADN information if a PDU session request is rejected, and with reference to FIG. 5, a procedure of transferring the LADN information for the corresponding LADN DNN through a PDU session creation response message will be described.

Figure 5:
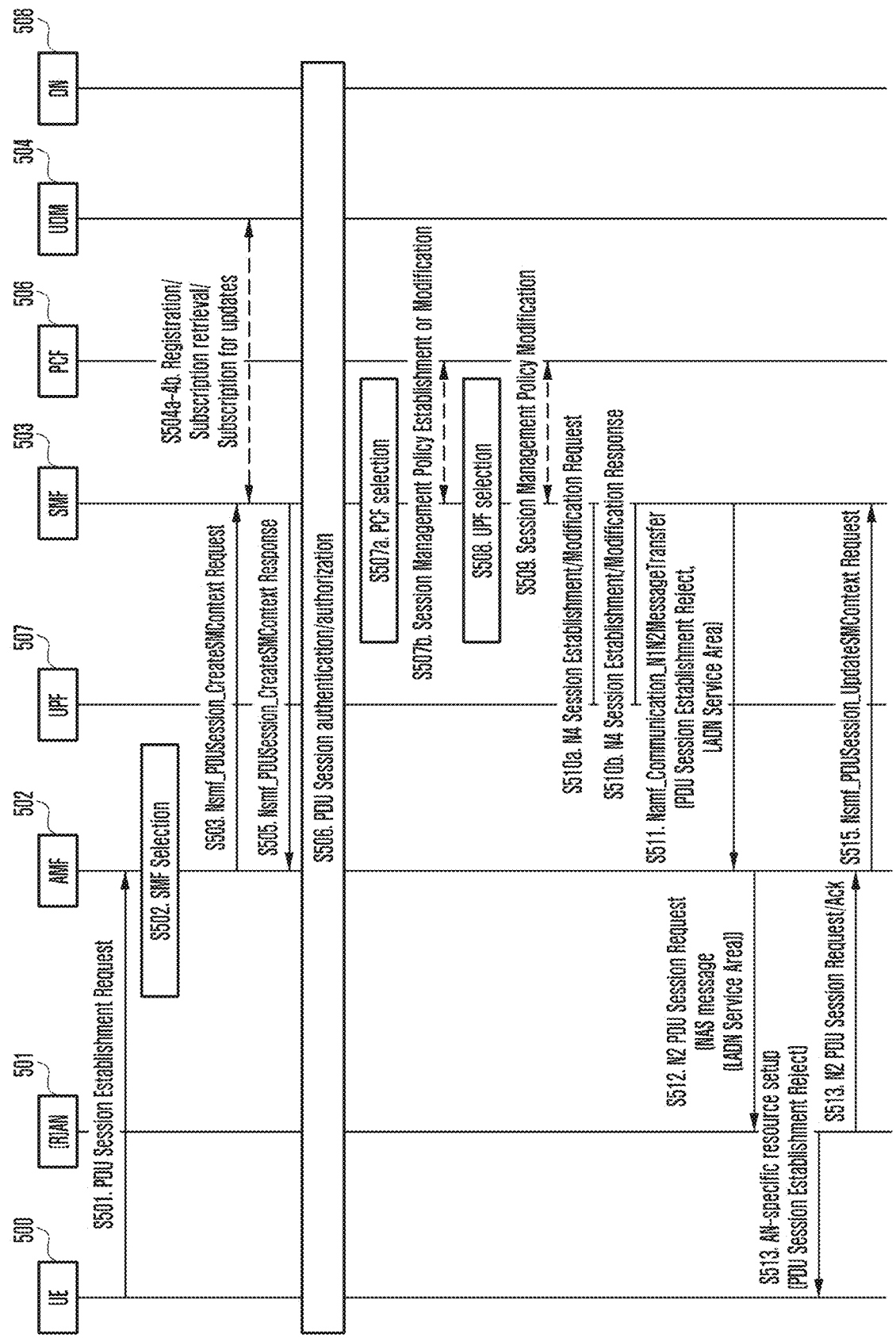
FIG. 5 illustrates a diagram of a procedure of transferring LADN information when a PDU session creation request is rejected.

First, with reference to FIG. 5, a terminal (UE) 500 may transmit a PDU session establishment request message to an AMF 502 through a base station 501 (S501). The AMF 502 having received this may select an SMF 503 based on the message (S502), and it may transmit signaling for requesting PDU session creation (Nsmf_PDUSession_CreateSMContext Request) to the selected SMF 503 (S503).

Accordingly, the selected SMF 503 performs an operation related to registration and subscription of a UDM 505 and the terminal 500 (Registration/Subscription retrieval/Subscription for updates) (S504a and S504b). Further, the SMF 503 may transmit a response signaling to the PDU session creation request (Nsmf_PDUSession_CreateSMContext Response) to the AMF 502 (S505).

Thereafter, an authentication/authorization procedure for the PDU session between the terminal 500 and a data network 508 is performed (S506).

The SMF 503 may select a PCF (S507a), and it may perform session management policy establishment and correction operation with the selected PCF 506 (S507b). Further, the SMF 503 may select a UPF 507 related to the session (S508), perform the session management policy correction procedure with the PCF 506 in relation to a selected UPF 507 (S509), and transmit/receive signaling related to the session establishment/correction with the selected UPF 507 (S510a and S510b).

Meanwhile, the SMF 503 determines whether to send the LADN information (LADN DNN and LADN service area) to the terminal 500. The SMF 503 may send predetermined LADN service area information to the terminal 500. The SMF 503 may send the LADN service area information intended to send to the terminal 500 together with successful PDU session creation with respect to the PDU session requested by the terminal 500 from the LADN DNN, or if the terminal 500 is not located in the LADN service area, the SMF 503 may send the LADN service area information together with an indication indicating a failure of the PDU session creation.

In this case, if the SMF 503 receives the PDU session creation request as in the (3-2)-th and (3-3)-th embodiments to be described later, the SMF 503 may request the corresponding AMF 502 to subscribe to the LADN DNN requested from the terminal 500, and it may receive LADN information on the corresponding LADN DNN from the AMF 502 as a response message to the request as described above. Further, if the SMF 503 receives a failure of the subscription request from the AMF 502, or the SMF 503 is notified that the terminal 500 is out of the LADN service area after the subscription request succeeded, the SMF 506 determines a rejection of the LADN session.

In this case, the SMF 503 requests acquisition of the LADN information from the corresponding AMF 502, and it receives the LADN information. Further, the SMF 503 may acquire information on the LADN through the UDM 504. The SMF 503 may include the acquired information on the LADN DNN in a PDU session response reject message, and it may transfer the PDU session response reject message to the terminal.

Further, if the LADN service area information is not established in the SMF 503, the SMF 503 may send, to the AMF 502, a message including an indication indicating that the terminal 500 sends the LADN service area information (S511), and the AMF 502 may transfer a NAS message including the LADN information to the RAN 501 (S512).

Through the above-described procedure, the base station 501 having received the NAS message releases a resource related to an access network (AN), and it transfers, to the terminal 500, the NAS message transferred from the AMF 502. After completion of the AN resource release, the base station 501 transfers a response message (S513) to an N2 PDU session request to the AMF 502, and the AMF 502 updates an SM context for the PDU session (S515).

The (2-2)-th Embodiment

In the (2-2)-th embodiment, with reference to FIG. 6, a method for transferring LADN information through a UE configuration update procedure or registration procedure in accordance with a terminal request after a PDU session request is rejected will be described. Hereinafter, explanation of the configuration duplicate to that in the above-described embodiments will be simplified or omitted.

Figure 6:
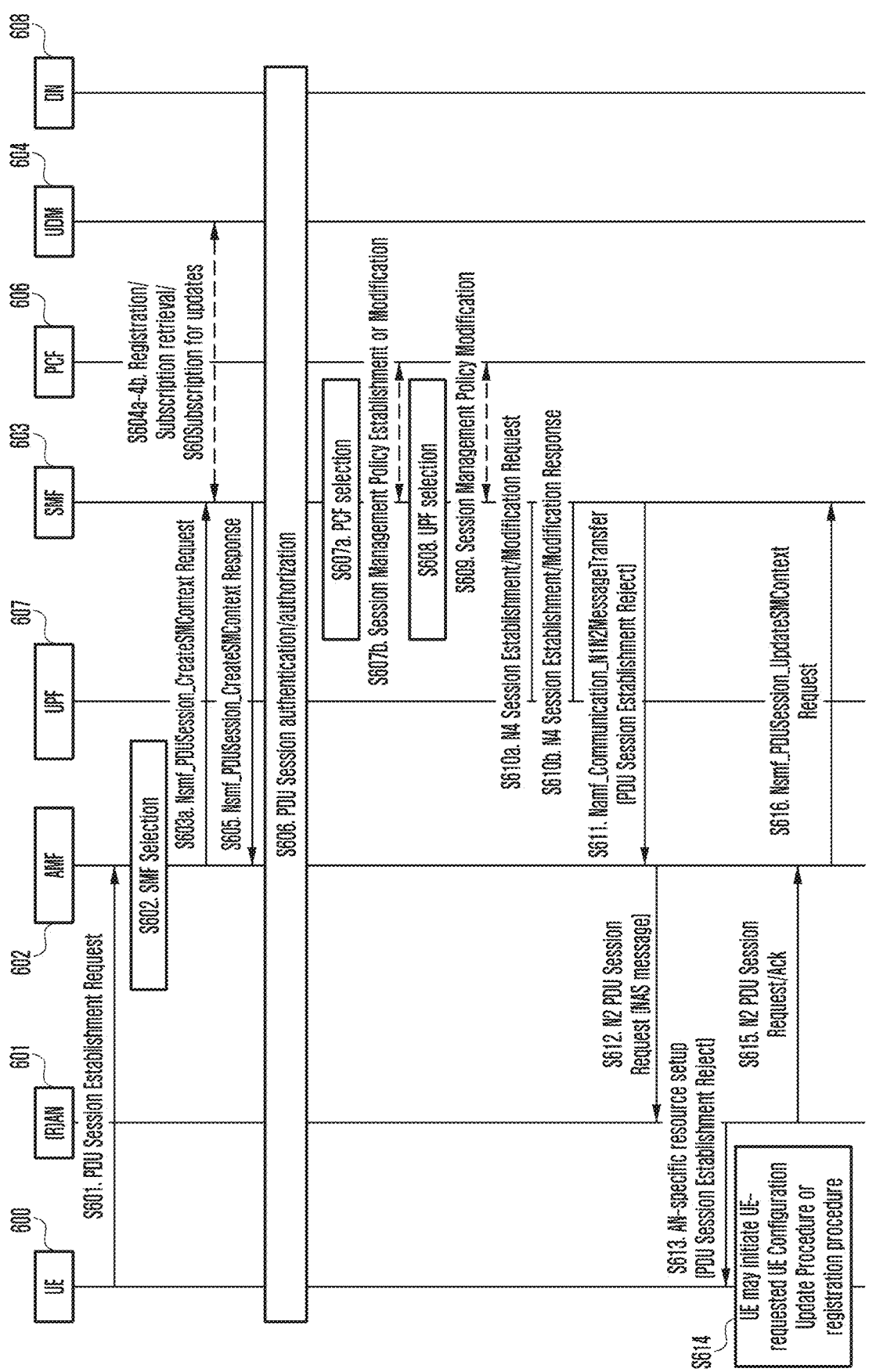
FIG. 6 illustrates a diagram of a procedure of performing a terminal-requested terminal (UE) configuration update after a PDU session request is rejected.

With reference to FIG. 6, a terminal (UE) 600 may transmit a PDU session establishment request message to an AMF 602 through a base station 601 (S601), and the AMF 602 having received this may select an SMF 603 based on the message (S602), and it may transmit signaling for requesting PDU session creation (Nsmf_PDUSession_CreateSMContext Request) to the selected SMF 603 (S603).

Accordingly, the selected SMF 603 performs an operation related to registration and subscription of a UDM 604 and the terminal 600 (Registration/Subscription retrieval/Subscription for updates) (S604a and S604b). Further, the SMF 603 may transmit a response signaling to the PDU session creation request (Nsmf_PDUSession_CreateSMContext Response) to the AMF 602 (S605).

Thereafter, an authentication/authorization procedure for the PDU session between the terminal 600 and a data network 608 is performed (S606).

The SMF 603 may select a PCF (S607a), and it may perform session management policy establishment and correction operation with the selected PCF 606 (S607b). Further, the SMF 603 may select a UPF 607 related to the session (S608), perform the session management policy correction procedure with the PCF 606 in relation to a selected UPF 607 (S609), and transmit/receive signaling related to the session establishment/correction with the selected UPF 607 (S610a and S610b).

Meanwhile, the SMF 603 determines a reject of the LADN PDU session request requested by the terminal 600, and it transfers, to the terminal 600 through the AMF 502, a PDU session creation response message including an indication notifying the terminal 600 of the reject of the LADN PDU session creation and an indication indicating that the terminal 600 is not in the LADN service area as a cause of the reject (S611 and S612).

The terminal 600 receives that the LADN PDU session creation request is rejected and it receives the cause of the reject reception corresponding to the fact that the terminal 600 is not in the LADN service area. The terminal 600 performs the terminal-requested terminal (UE) configuration update procedure as described above in the (1-1)-th embodiment (S614), and it receives the LADN information.

The base station 601 having received the NAS message releases a resource related to an access network (AN), and it transfers, to the terminal 600, the NAS message transferred from the AMF 602. After completion of the AN resource release, the base station 601 transfers a response message (S615) to an N2 PDU session request to the AMF 602, and the AMF 602 updates an SM context for the PDU session (S626).

The (2-3)-th Embodiment

In the (2-3)-th embodiment, with reference to FIG. 7, a procedure will be described, in which an SMF having rejected PDU session creation requested by a terminal makes an AMF perform a terminal (UE) configuration update procedure.

Figure 7:
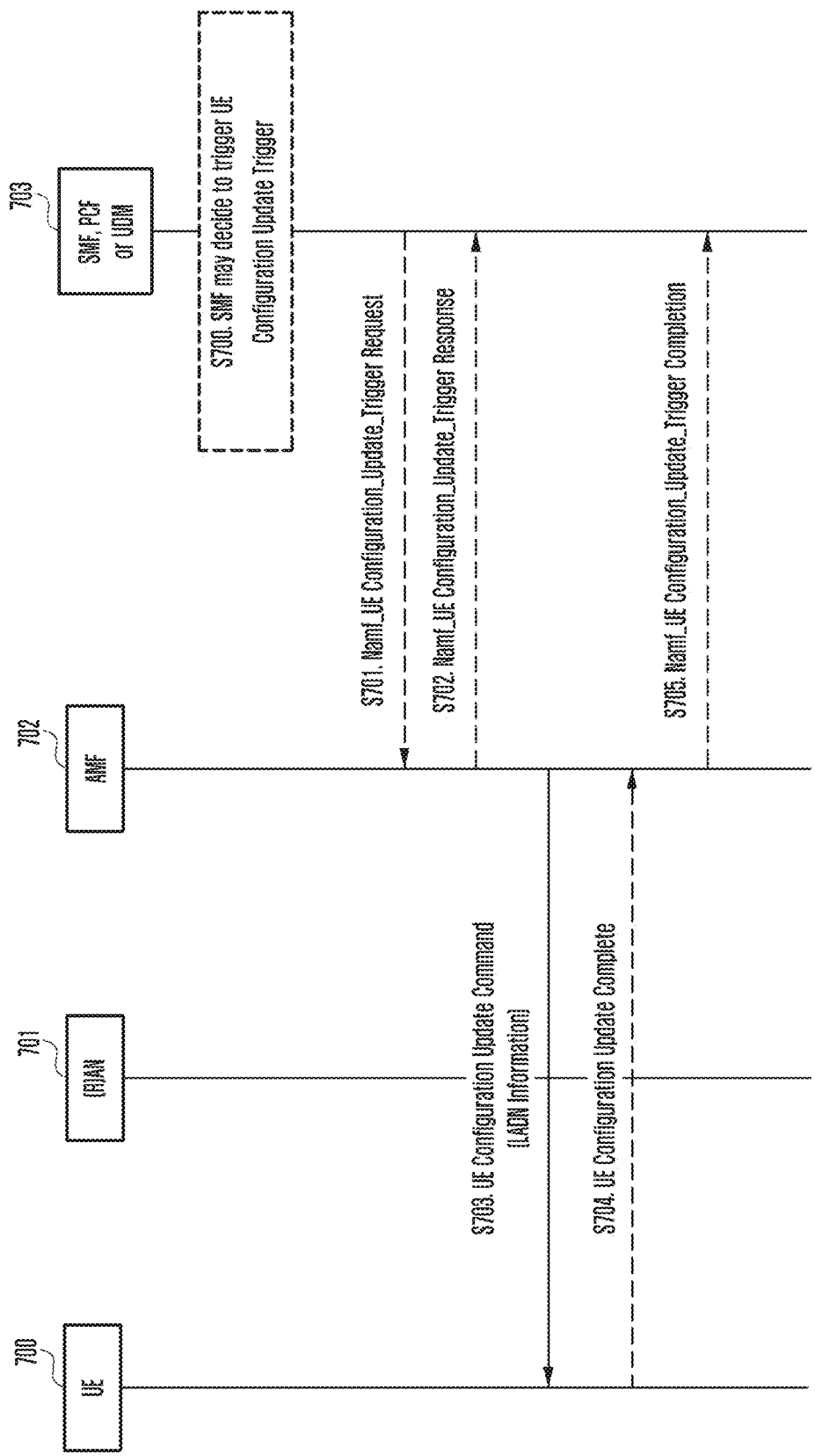
FIG. 7 illustrates a diagram of a procedure in which an SMF performs LADN information update using a UF configuration update trigger.

With reference to FIG. 7, if a terminal 700 requests a PDU session for an LADN DNN, but the terminal 700 is not located in the corresponding LADN service area, an SMF 703 rejects the PDU session creation requested by the terminal 700. Further, the SMF 703 may determine to trigger a UE configuration update trigger procedure (S700).

Further, in order to update the LADN information in the terminal 700, the SMF 703 transfers, to an SMF 702, a Namf_UE_Configuration_Update_Trigger message for triggering the UE configuration update procedure (S701). This message includes an indication for requesting the corresponding terminal 700 to update the LADN information.

In response to this, the AMF 702 transmits a response message to the UE configuration update trigger to the SMF 703 (S702). Further, the AMF 702 transfers, to the terminal 700, a list of LADN information available to the terminal 700 in the current registration area (S703).

The terminal 700 transmits, to the AMF 702, a message for notifying of completion of the UE configuration update in response to the transmission of the AMF 702 (S704), and the AMF 702 transfers the contents in which the terminal 700 has successfully completed the UE configuration update to the SMF 703 (S705).

The (2-4)-th Embodiment

In the (2-4)-th embodiment, a condition on which a terminal triggers an LADN session creation request will be described.

A CP having received a request for LADN session creation from an AP of a terminal requests PDU session creation according to the disclosure. If the terminal is in a location where the LADN session is allowed, the PDU session is created. If the terminal is in a location where the LADN session is not allowed, the LADN session creation is rejected in the same manner as that in the (2-1)-th or (2-2)-th embodiment.

If the LADN session creation is rejected, the CP of the terminal may acquire the LADN information from the network through the PDU session request reject message as in the (2-1)-th embodiment, through the network UE configuration command as in the (2-1)-th embodiment, or the same LADN method as that according to the (1-1)-th, (1-2)-th, and (1-3)-th embodiments requested by the terminal after the session creation reject.

The AP having acquired the LADN information may transfer the corresponding information to the CP, or if the terminal enters into the corresponding area, information on the LADN DNN being available may be transferred to the AP.

The (3-1)-th Embodiment

Figure 8A:
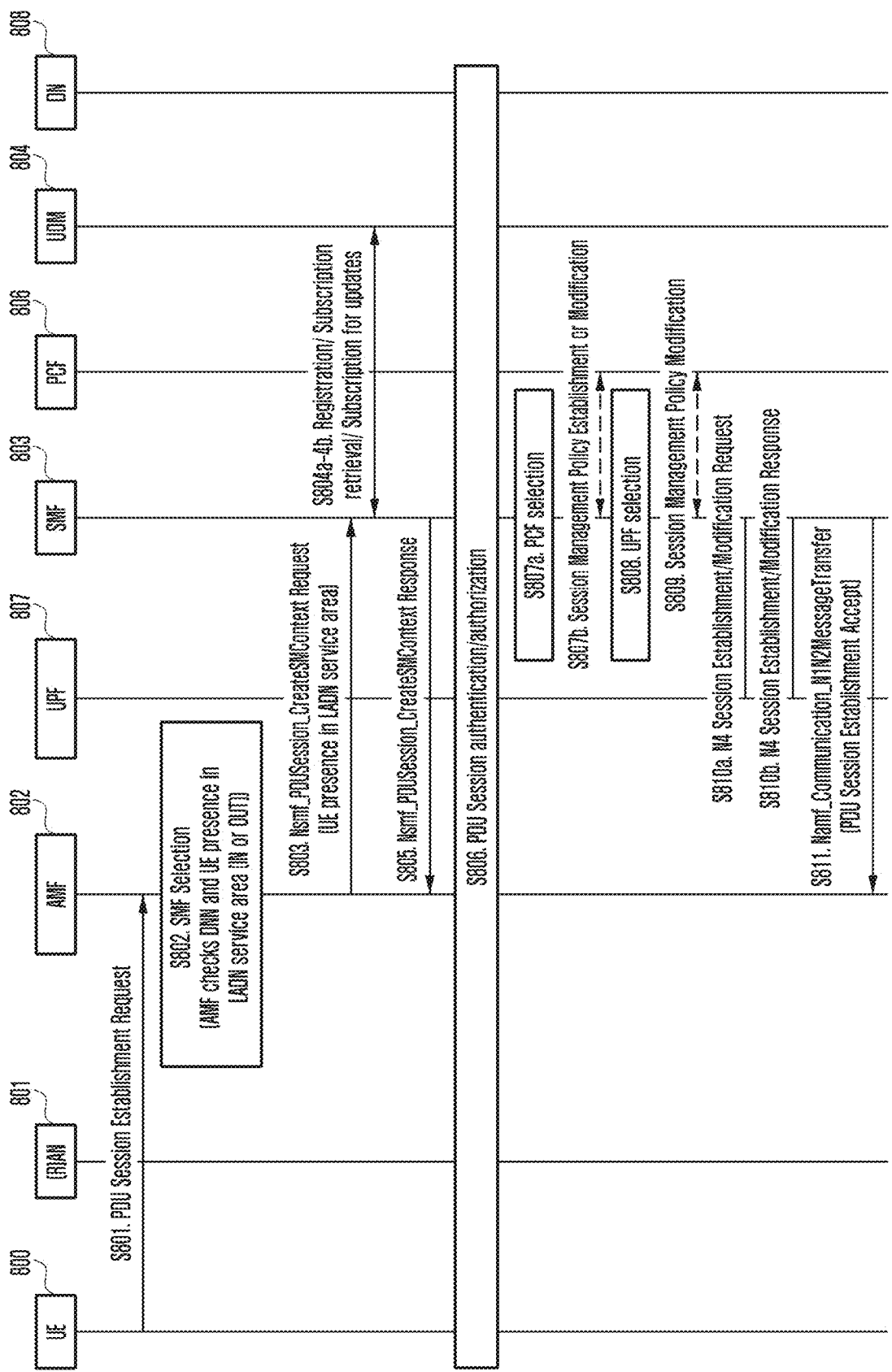
FIG. 8A illustrates a diagram of a procedure in which an AMF transfers a terminal LADN related location to an SMF and the SMF determines whether to allow LADN session creation.
Figure 8B:
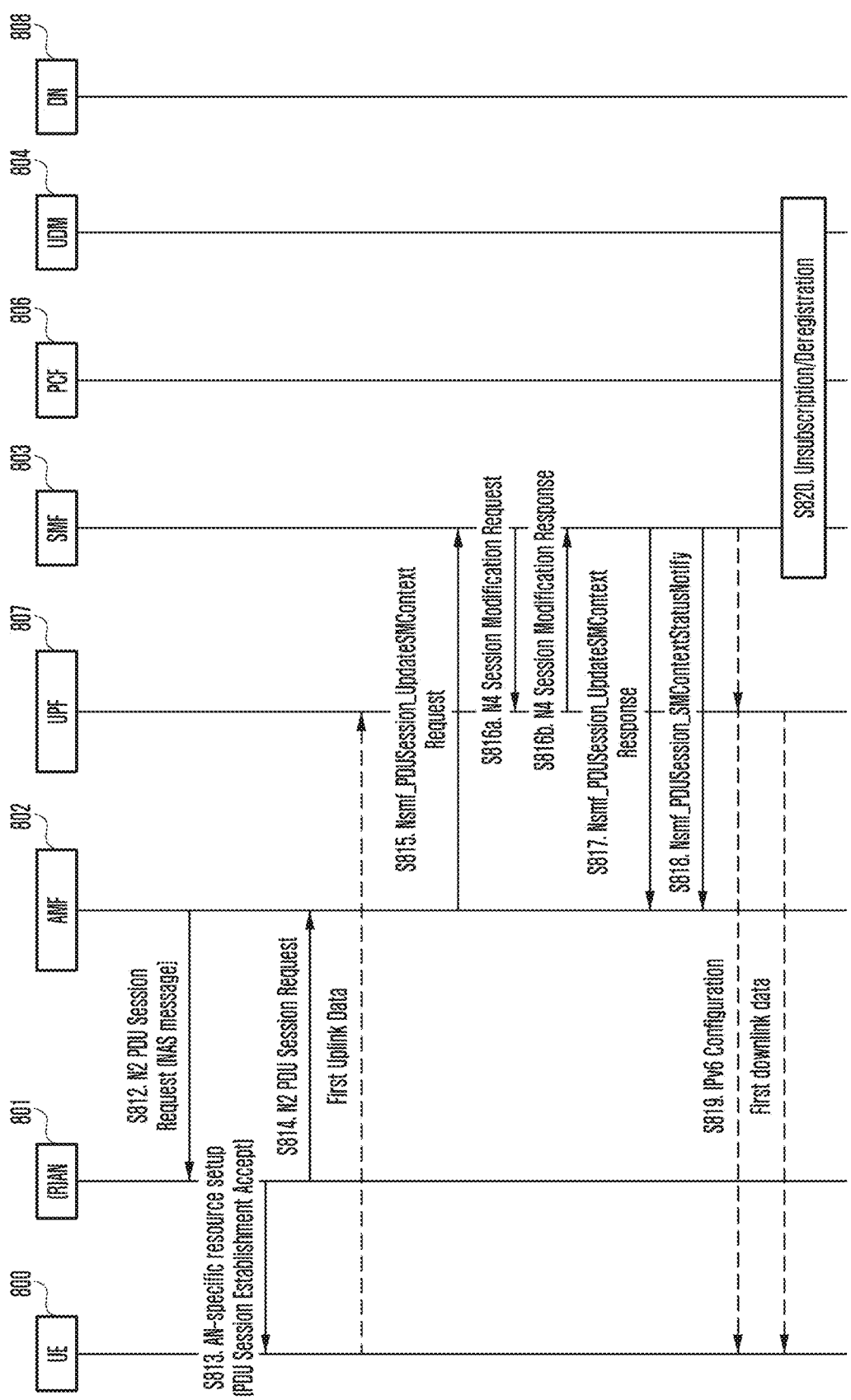
FIG. 8B illustrates a diagram of a procedure in which an AMF transfers a terminal LADN related location to an SMF and the SMF determines whether to allow LADN session creation.

In the (3-1)-th embodiment, with reference to FIGS. 8A and 8B, a method and a procedure will be described, in which an SMF determines whether to allow LADN session creation by identifying LADN-related location information received from an AMF. Here, it is preferable that FIGS. 8A and 8B are understood to illustrate a successive procedure. Further, explanation of the configuration duplicate to that in the embodiments as described above with reference to the above-described drawings will be simplified or omitted.

With reference to FIGS. 8A and 8B, a terminal (UE) 800 according to an embodiment of the disclosure may transmit a PDU session establishment request message for requesting PDU session creation to an AMF 802 through a base station 801 (S801). The AMF 802 having received this determines whether a DNN included in the PDU session establishment request message requested by the terminal 800 is an LADN DNN established in the AMF 802, and if the DNN is the LADN DNN established in the AMF 802, the AMF 802 determines whether the terminal 800 is currently located in an LADN service area (S802).

Based on this, the AMF 802 makes terminal LADN-related information (i.e., indication indicating whether the terminal exists in the LADN area) contain a value "IN" if the terminal 800 is currently located in the LADN service area, and it makes the terminal LADN-related information contain a value "OUT" otherwise, and it transfers the terminal LADN-related information to an SMF 803 (S803). Unlike this, if the LADN information of the DNN transferred by the terminal 800 is not configured in the AMF 802, the AMF 802 does not send LADN-related terminal location information.

Meanwhile, the SMF 803 identifies whether the DNN sent by the terminal 800 is a DNN that can be provided by the SMF 803, for example, if the DNN is the DNN that can be provided by the SMF 803, and the LADN-related terminal location information sent by the AMF 802 is "IN", the SMF 803 determines to allow the PDU session creation request for the LADN currently sent by the terminal 800. Otherwise, the SMF 803 rejects the PDU session creation request.

For example, if the SMF 803 determines to allow the PDU session creation request, the SMF 803 performs an operation related to registration and subscription of a UDM 804 and the terminal 800 (Registration/Subscription retrieval/Subscription for updates) (S804a and S804b). Further, the SMF 803 may transmit a response signaling to the PDU session creation request (Nsmf_PDUSession_CreateSMContext Response) to the AMF 802 (S805).

Thereafter, an authentication/authorization procedure for the PDU session between the terminal 800 and a data network 808 is performed (S806).

The SMF 803 may select a PCF (S807a), and it may perform session management policy establishment and correction operation with the selected PCF 806 (S807b). Further, the SMF 803 may select a UPF 807 related to the session (S808), perform the session management policy correction procedure with the PCF 806 in relation to a selected UPF 807 (S809), and transmit/receive signaling related to the session establishment/correction with the selected UPF 807 (S810a and S810b).

Further, the SMF 803 transmits a message including information indicating that the PDU session creation has been accepted (Namf_Communication_N1N2Message Transfer) to the AMF 802 (S811). In response to this, the AMF 802 may transmit a PDU session request message (NAS message) to the base station 801 (S812), and the base station 801 may transmit a message for notifying of acceptance of the PDU session creation to the terminal 800 based on the received message (S813), and it may transmit an ACK for the PDU session request to the AMF 802. If the PDU session is created based on this, the terminal 800 may transmit uplink data to the UPF 807 of the corresponding PDU session.

Meanwhile, if the AMF 802 transmits a message (Nsmf_PDUSession_UpdateSMContext Request) for the PDU session in a downlink direction to the SMF 803, the SMF 803 may transmit and receive signaling for session correction with the UPF 807 (S816a and S816b), and it may transmit a response (Nsmf_PDUSession_UpdateSMContext Response) to the message received from the AMF 802 (S817).

If the SM Context update has failed, the SMF 803 transfers Nsmf-PDUSession_SMContextStatusNotify message to the AMF 802 (S818). If the PDU session created with the terminal 800 is IPv6 after the PDU session creation, the SMF 803 performs an IPv6 address auto configuration procedure (S819). Thereafter, if a downlink data packet toward the terminal 800 arrives, it is possible to transmit the downlink data packet to the terminal 800. If the PDU session creation has failed, a procedure (S820) for deleting a context for the corresponding PDU session is performed through the UDM 804.

The (3-2)-th Embodiment

In the (3-2)-th embodiment, with reference to FIGS. 9A and 9B, a method and a procedure will be described, in which an SMF requests an AMF to subscribe to a terminal mobility event report service if a PDU session for an LADN DNN is received, and depending on whether the subscription has succeeded, the SMF determines whether to allow LADN session creation for a terminal.

Figure 9A:
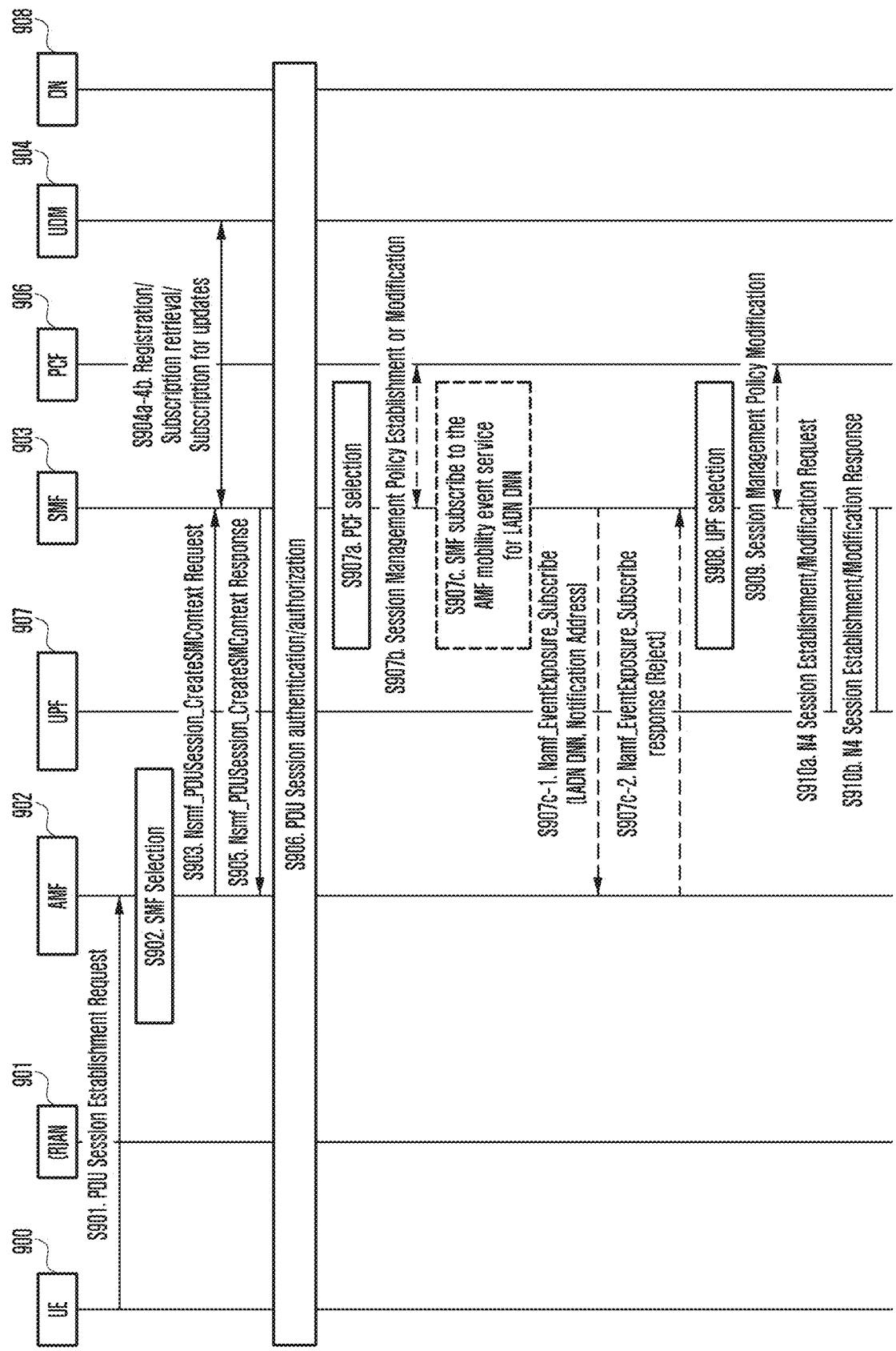
FIG. 9A illustrates a diagram of a method for determining whether to allow an LADN session by determining success/failure of a terminal mobility that an SMF reports to an AMF through an LADN DNN.

FIGS. 9A and 9B illustrate a method in which an SMF determines whether to allow an LADN session depending on whether an AMF has succeeded or failed in subscribing to a terminal mobility report through an LADN DNN. It is preferable that FIGS. 9A and 9B are understood to illustrate a connected procedure. In FIGS. 9A and 9B, because procedures of S901 to S906 are the same as the procedures illustrated in FIG. 8A, detailed explanation of signaling will be omitted.

With reference to FIG. 9A, if an authentication/authorization process for a PDU session is completed, an SMF 903 may select a PCF 906 establishing a related policy (S907a) and may perform session management policy establishment and correction operation with the selected PCF 906 (S907b). Further, the SMF 903 may determine to subscribe to a terminal mobility event report service for an LADN DNN (S907c). For this, the SMF 903 may transmit a subscription request message including the LADN DNN and notification address information to an AMF 902 (S907c-1). However, the AMF 902 may reject the corresponding subscription request in response to the subscription request message (S907c-2).

If failure of the terminal mobility report service subscription is identified, the SMF 903 may determine that the terminal 900 is not located at the LADN DNN, and may reject the PDU session creation request. In this case, the SMF 903 determines the reject of the PDU session creation request, and transfers the session request reject to the terminal 900 together with the corresponding cause of the reject.

If the SMF 903 determines the reject of the session creation request, the SMF 903 transfers a NAS message to the AMF 902 (S912), and the AMF 902 transfers the NAS message to the base station 901 (S912), and the base station 901 transfers the NAS message (S913).

If the SMF 903 requests the session creation request reject, procedures S908 and S901a/b and procedures S915 to S917 that are procedures subsequent to S914 are not performed. Further, after S914, the procedures S915 to S917 and the procedure S920 are not performed. The SMF 903 may delete a context related to the AMF 902 by sending a Nsmf_PDUSessionCMContextStatusNotify message to the AMF 902 (S918).

The (3-3)-th Embodiment

Figure 10B:
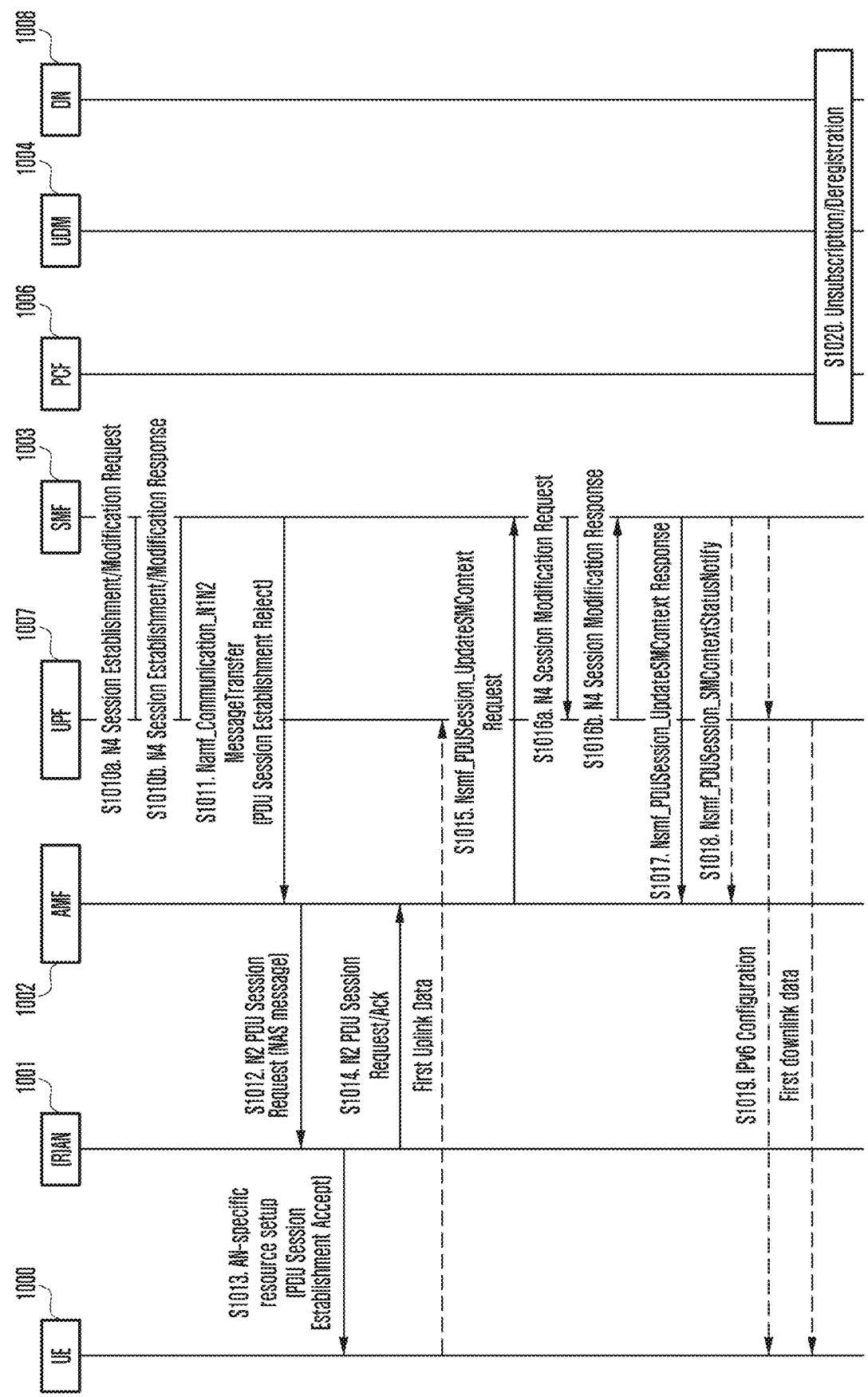
FIG. 10B illustrates a diagram of a procedure in which an SMF determines whether to allow LADN session creation after reception of LADN related location information from an AMF after the SMF has successfully subscribed to a terminal mobility report service provided by the AMF as an LADN DNN.

In the (3-3)-th embodiment, with reference to FIGS. 10A and 10B, a method and a procedure will be described, in which if an SMF receives a PDU session for an LADN DNN, the SMF receives an event report for a terminal region of interest (i.e., report on whether the terminal is out of or inside an LADN service area) from an AMF after the AMF subscribes to a terminal mobility event report service, and it determines whether to allow LADN session creation for the terminal. It is preferable that FIGS. 10A and 10B are understood to illustrate connected procedures. Hereinafter, in describing the procedures of FIGS. 10A and 10B, explanation duplicate to that of the above-described embodiments will be omitted.

With reference to FIG. 10A, a terminal 1000 may request an AMF 1002 to create the PDU session through a base station 1001 (S1001). Because the subsequent procedures S1001 to S1006 are the same as the procedures S802 to S806 of FIG. 8A as described above, the related explanation will be omitted.

If an authentication/authorization process for a PDU session is completed, an SMF 1003 may select a PCF 1006 establishing a related policy (S1007a) and may perform session management policy establishment and correction operation with the selected PCF 1006 (S1007b). Further, if a DNN sent by the terminal 1000 is serviceable, the SMF 1003 determines the AMF 1002 servicing the terminal 1000 to subscribe to a terminal mobility event report service (S1007c). Further, the SMF 1003 transfers a Namf_Event-Exposure_Subscribe message to the AMF 1002 (S1007c-1). This message includes a terminal ID (subscription parameter identifier (SUPI) or generic public subscription identifier (GPSI)), LADN DNN, and notification address of the SMF 1003.

The AMF 1002 identifies whether the LADN DNN received from the SMF 1003 is the LADN DNN currently established in the AMF 1002. If the LADN DNN is not currently established, the AMF 1002 rejects subscription of the terminal mobility event report. As another example, if the LADN DNN is established in the AMF 1002, or if the terminal 1000 is not currently located in an LADN service area, the AMF 1002 rejects the subscription of the terminal mobility event report.

Unlike this, if the AMF 1002 determines to allow subscription to the terminal mobility event service, the AMF 1002 transmits a response message indicating that the subscription has succeeded to the SMF 1003 (S1007c-2). Further, the AMF 1002 determines whether the terminal 1000 exists in a region of interest (i.e., whether the terminal 1000 exists in the LADN service area), and reports the result of the determination (i.e., "IN" or "OUT") to the SMF 1003 (S1007c-3).

With reference to FIG. 10B, if the subscription to the terminal mobility report service for the AMF 1002 has succeeded, the SMF 1003 determines that the terminal 1000 is in the LADN service area, and it determines an accept of the PDU session creation request. If the subscription to the terminal mobility report service for the AMF 1002 has failed, the SMF 1003 determines reject of the PDU session creation request, and it transfers the session request reject to the terminal 1000 together with the corresponding cause of the reject.

The (4-1)-th Embodiment

In the (4-1)-th and (4-2)-th embodiments, a method and a procedure will be described, in which an SMF determines whether to transfer a downlink packet toward a terminal in accordance with the location of the terminal.

In the (4-1)-th embodiment, a method for the SMF to drop a downlink packet toward the terminal if the terminal gets out of an LADN service area will be described.

If a successful PDU session for an LADN DNN requested by the terminal is created, the SMF makes an AMF subscribe to a report service on whether a terminal region of interest for the LADN service area exists.

If it is detected that the terminal moves out of the LADN service area, the AMF reports existence/nonexistence of the terminal region of interest to the SMF. The SMF receives the report, and if the reported value is information (i.e., "OUT") indicating that the terminal is out of the LADN area, the SMF releases a session or deactivates an UP connection of the session and instructs an UPF to drop the packet.

If the SMF supports SMF buffering, the SMF may request starting of SMF packet forwarding from the UPF. Thereafter, if the SMF receives a downlink packet toward the terminal from the UPF outside the LADN service area, the SMF drops the downlink packet.

The (4-2)-th Embodiment

In the (4-2)-th embodiment, a method for the SMF to determine transfer or buffering of a downlink packet toward the terminal if the terminal re-enters into an LADN service area will be described.

If a successful PDU session for an LADN DNN requested by the terminal is created, the SMF makes an AMF subscribe to a report service on whether a terminal region of interest for the LADN service area exists.

If it is detected that the terminal moves out of the LADN service area, the AMF reports existence/nonexistence of the terminal region of interest to the SMF. The SMF receives the report, and if the reported value is information (i.e., "IN") indicating that the terminal is out of the LADN area, the SMF enables a downlink data notification (DDN). That is, if the SMF supports UPF buffering, the SMF indicates the UPF to start packet forwarding to the SMF. Further, if the SMF receives a downlink packet or if the SMF receives downlink data notification (DDN) from the UPF, the SMF performs a network triggered service request procedure.

Figure 11:
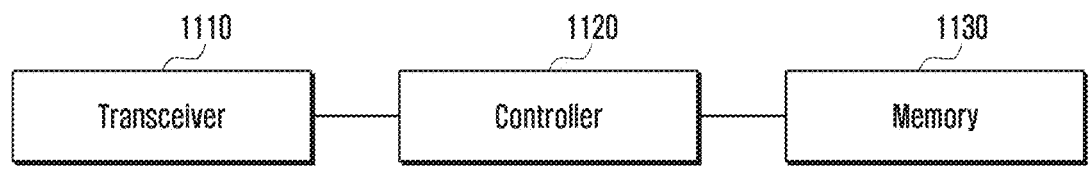
FIG. 11 illustrates a diagram of a terminal according to the disclosure.

FIG. 11 illustrates a diagram of a terminal according to the disclosure.

The terminal according to the disclosure may include a transceiver 1110, a controller 1120, and a memory 1130. According to an embodiment, the controller 1120 may determine a terminal (UE) configuration update request in order to receive LADN information. Further, according to an embodiment, the transceiver 1110 may send the UE configuration update request to an AMF in order to receive the LADN information.

Figure 12:
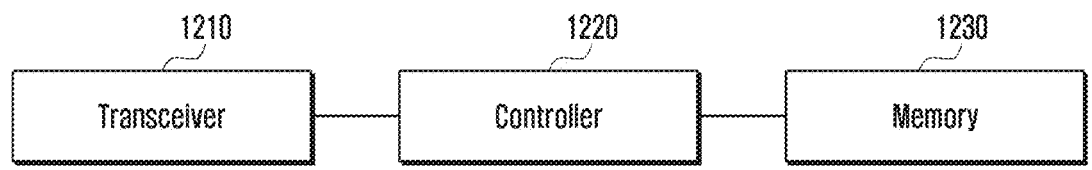
FIG. 12 illustrates a diagram of an AMF according to the disclosure.

FIG. 12 illustrates a diagram of an AMF according to the disclosure.

The AMF according to the disclosure may include a transceiver 1210, a controller 1220, and a memory 1230. According to an embodiment, the controller 1220 may control the transceiver 1210 to request subscriber information from a UDM in order to determine whether a requested terminal can use an LADN. Further, according to an embodiment, the controller 1220 may determine whether the terminal is allowed to use an LADN service and may control the transceiver 1210 to transfer a list of LADN information used by the allowed terminal in the current registration area of the terminal.

Figure 13:
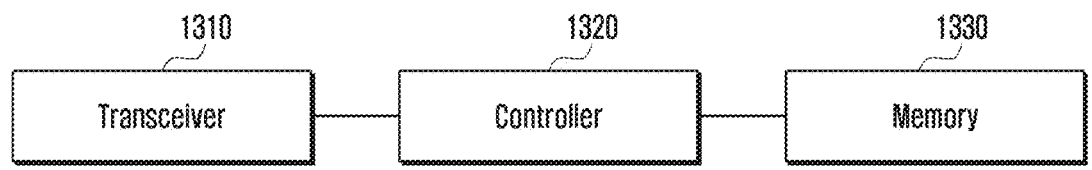
FIG. 13 illustrates a diagram of an SMF according to the disclosure.

FIG. 13 illustrates a diagram of an SMF according to the disclosure.

The SMF according to the disclosure may include a transceiver 1310, a controller 1320, and a memory 1330. According to an embodiment, the controller 1320 may determine to send LADN information (LADN DNN and LADN service area) to a terminal. Further, according to an embodiment, the controller 1320 may control the transceiver 1310 to send predetermined LADN service area information to the terminal.

The disclosure relates to a 5G or pre-5G communication system to be provided to support higher data rates than the data rates of post-4G communication system such as LTE.

According to an embodiment of the disclosure, if needed, a terminal transfers a terminal (UE) configuration update request message to an AMF, and the AMF includes LADN information including LADN DNN and LADN service area information available in a registration area of the terminal in a UE configuration information update message to be transmitted to the terminal. Further, the terminal may include an indication requesting the LADN information in a registration request message, and the AMF may transfer the LADN information to the terminal in response to the indication requesting the LADN information. Further, the AMF may transfer, to the terminal, an indication indicating whether LADN information is available in the registration process of the terminal, and the terminal having received this may acquire the LADN information in accordance with the request.

According to another embodiment of the disclosure, the terminal may request creation of a PDU session including the LADN DNN, and it may acquire the LADN DNN information together with a corresponding reject message. Further, the terminal can acquire the LADN information through requesting with the cause of the reject of the PDU session creation or through a terminal (UE) configuration information update procedure triggered by the SMF.

The disclosure proposes a method in which the SMF determines whether to allow the LADN creation. In the PDU session creation process, the SMF determines to accept or reject the PDU session request through LADN-related location information received from the AMF. Further, the SMF requests the AMF to subscribe to a terminal mobility report service in the PDU session creation process, and it determines whether to accept the LADN session depending on whether to accept a subscription request. Further, in the PDU session creation process, the SMF may determine witer to accept the LADN session after the AMF successfully subscribes to the terminal mobility report service or after the existence inside or outside the LADN area is reported from the AMF.

In still another embodiment of the disclosure, a method and a procedure will be described, in which the SMF determines whether to transfer a downlink packet toward a terminal in accordance with the location of the terminal. That is, if it is reported by an AMF that the terminal gets out of an LADN service area, the SMF indicates to drop the downlink packet toward the terminal. If it is reported by the AMF that the terminal re-enters into the LADN service area, the SMF indicates a UPF to buffer the downlink packet toward the terminal, or it indicates the UPF to start SMF buffering.

Although embodiments of the disclosure have been described in the specification and drawings, these merely present specific examples to easily explain the technical contents of the disclosure and to help understanding of the disclosure, and do not limit the scope of the disclosure. It will be apparent to those of ordinary skill in the art to which the disclosure pertains that various modifications are possible based on the technical concept of the disclosure in addition to the embodiments disclosed herein. Further, if needed, the respective embodiments may be combined with each other to be operated. For example, parts of the embodiments of the disclosure may be combined with each other and may be operated by a base station and a terminal.

Although preferred embodiments of the disclosure have been described in the specification and drawings and specific wordings have been used, these are merely used as general meanings to assist those of ordinary skill in the art to gain a comprehensive understanding of the disclosure, and do not limit the scope of the disclosure. It will be apparent to those of ordinary skill in the art to which the disclosure pertains that various modifications are possible based on the technical concept of the disclosure in addition to the embodiments disclosed herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method by an access and mobility management function (AMF) entity in a wireless communication system, the method comprising:
  receiving, from a terminal, a registration request message including an indication for requesting local area data network (LADN) information;
  receiving, from a user data management (UDM), subscription information for the terminal including a subscribed data network name (DNN) of the terminal;
  identifying LADN information for a list of LADN available to the terminal based on the indication and the subscription information; and
  transmitting, to the terminal, a registration accept message including the identified LADN information,
  wherein the list of the LADN is at least one LADN DNN configured in the AMF entity.

2. The method of claim 1, wherein the list of LADN is all the LADN DNNs configured in the AMF entity, based on the indication for requesting the LADN information being included in the registration request message.

3. The method of claim 1, the method comprising:
  identifying the subscribed DNN of the terminal based on the received subscription information.

4. The method of claim 1, wherein the registration request message is received from a communication processor (CP) of the terminal, based on the LADN information being requested from an application processor (AP) of the terminal to the CP of the terminal.

5. The method of claim 1, wherein, in case that the received registration request message includes at least one LADN DNN instead of the indication for requesting LADN information and the subscribed DNN of the terminal includes the received at least one LADN DNN, the list of LADN includes the received at least one LADN DNN.

6. A method by a terminal in a wireless communication system, the method comprising:
  transmitting, to an access and mobility management function (AMF) entity, a registration request message including an indication for requesting local area data network (LADN) information; and
  receiving, from the AMF entity, a registration accept message including LADN information for a list of LADN available to the terminal, wherein the LADN information for the list of LADN available to the terminal is identified based on the indication and subscription information for the terminal, and the subscription information including a subscribed data network name (DNN) of the terminal, wherein the list of the LADN is at least one LADN DNN in the AMF entity.

7. The method of claim 6, wherein the list of LADN is all the LADN DNNs configured in the AMF entity, based on the indication for requesting the LADN information being included in the registration request message.

8. The method of claim 6, wherein the subscribed DNN of the terminal is identified based on the subscription information.

9. The method of claim 6, wherein the transmitting the registration request message comprises:
   requesting, from an application processor (AP) of the terminal to a communication processor (CP), the LADN information; and
   transmitting, from the CP of the terminal to the AMF entity, the registration request message based on the request of the AP of the terminal.

10. The method of claim 6, wherein, in case that the transmitted registration request message includes at least one LADN DNN instead of the indication for requesting LADN information and the subscribed DNN of the terminal includes the received at least one LADN DNN, the list of LADN includes the received at least one LADN DNN.

11. An access and mobility management function (AMF) entity in a wireless communication system, the AMF entity comprising:
   a transceiver; and
   a controller configured to:
      control the transceiver to receive, from a terminal, a registration request message including an indication for requesting local area data network (LADN) information, and receive, from a user data management (UDM), subscription information for the terminal including a subscribed data network name (DNN) of the terminal,
      identify LADN information for a list of LADN available to the terminal based on the indication and the subscription information, and
      control the transceiver to transmit, to the terminal, a registration accept message including the identified LADN information,
   wherein the list of the LADN is at least one LADN DNN configured in the AMF entity.

12. The AMF entity of claim 11, wherein the list of LADN is all the LADN DNNs configured in the AMF entity, based on the indication for requesting the LADN information being included in the registration request message.

13. The AMF entity of claim 11, wherein the controller is further configured to identify the subscribed DNN of the terminal based on the received subscription information.

14. The AMF entity of claim 11, wherein the registration request message is received from a communication processor (CP) of the terminal, based on the LADN information being requested from an application processor (AP) of the terminal to the CP of the terminal.

15. The AMF entity of claim 11, wherein, in case that the received registration request message includes at least one LADN DNN instead of the indication for requesting LADN information and the subscribed DNN of the terminal includes the received at least one LADN DNN, the list of LADN includes the received at least one LADN DNN.

16. A terminal in a wireless communication system, the terminal comprising:
   a transceiver; and
   a controller configured to control the transceiver to:
      transmit, to an access and mobility management function (AMF) entity, a registration request message including an indication for requesting local area data network (LADN) information; and
      receive, from the AMF entity, a registration accept message including LADN information for a list of LADN available to the terminal, wherein the LADN information for the list of LADN available to the terminal is identified based on the indication and subscription information for the terminal, and the subscription information including a subscribed data network name (DNN) of the terminal,
   wherein the list of the LADN is at least one LADN DNN in the AMF entity.

17. The terminal of claim 16, wherein the list of LADN is all the LADN DNNs configured in the AMF entity, based on the indication for requesting the LADN information being included in the registration request message.

18. The terminal of claim 16, wherein the subscribed DNN of the terminal is identified based on the subscription information.

19. The terminal of claim 16, wherein the controller is further configured to:
   request, from an application processor (AP) of the terminal to a communication processor (CP), the LADN information, and
   transmit, from the CP of the terminal to the AMF entity, the registration request message based on the request of the AP of the terminal.

20. The terminal of claim 16, wherein, in case that the transmitted registration request message includes at least one LADN DNN instead of the indication for requesting LADN information and the subscribed DNN of the terminal includes the received at least one LADN DNN, the list of LADN includes the received at least one LADN DNN.

* * * * *